(12) United States Patent
Tiedemann, Jr. et al.

(10) Patent No.: US 6,977,967 B1
(45) Date of Patent: *Dec. 20, 2005

(54) METHOD AND APPARATUS FOR PERFORMING FAST POWER CONTROL IN A MOBILE COMMUNICATION SYSTEM

(75) Inventors: Edward G. Tiedemann, Jr., San Diego, CA (US); Tao Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/597,940

(22) Filed: Jun. 20, 2000

Related U.S. Application Data

(63) Continuation of application No. 08/559,386, filed on Nov. 15, 1995, now Pat. No. 6,137,840, which is a continuation-in-part of application No. 08/414,633, filed on Mar. 31, 1995, now abandoned, and a continuation of application No. 08/958,882, filed on Oct. 27, 1997, now Pat. No. 6,035,209.

(51) Int. Cl.[7] .......... G04K 1/02; H04L 25/03; H04L 25/49

(52) U.S. Cl. .......... 375/297; 455/522; 455/69

(58) Field of Search .......... 375/297, 296, 375/254, 278, 284, 285, 395, 299, 222, 225, 375/345; 370/352, 316, 317; 455/116, 126, 455/127, 68, 69, 522, 13.4; 714/708

(56) References Cited

U.S. PATENT DOCUMENTS

| | | | |
|---|---|---|---|
| 5,029,331 A | 7/1991 | Heichler et al. |
| 5,056,109 A | 10/1991 | Gilhousen et al. |
| 5,103,459 A | 4/1992 | Gilhousen et al. |
| 5,109,390 A | 4/1992 | Gilhousen et al. |
| 5,128,965 A | 7/1992 | Henriksson |
| 5,204,876 A | 4/1993 | Bruckert et al. |
| 5,220,678 A | 6/1993 | Feei |
| 5,267,262 A | 11/1993 | Wheatley, III |
| 5,287,555 A | 2/1994 | Wilson et al. |
| 5,305,468 A | 4/1994 | Bruckert et al. |
| 5,341,396 A | 8/1994 | Higgins et al. |
| 5,390,338 A | 2/1995 | Bodin et al. |
| 5,396,516 A | 3/1995 | Padovani et al. |
| 5,414,796 A | 5/1995 | Jacobs et al. |
| 5,465,399 A | 11/1995 | Oberholtzer et al. |
| 5,485,486 A | * | 1/1996 | Gilhousen et al. |
| 5,487,180 A | 1/1996 | Ohtake |
| 5,504,773 A | 4/1996 | Padovani et al. |

(Continued)

FOREIGN PATENT DOCUMENTS

EP 0564937 10/1993

(Continued)

*Primary Examiner*—Jean B. Corrielus
(74) *Attorney, Agent, or Firm*—Philip R. Wadsworth; Thien T. Nguyen; George J. Oehlinc

(57) ABSTRACT

A method and apparatus for controlling transmission power in a mobile communication system is disclosed. The method disclosed provides for a closed-loop power control method for variable rate transmissions. The power of transmissions is varied in accordance with the rate of the frames of data being transmitted. The transmission power between the rates can be a fixed or variable difference.

10 Claims, 10 Drawing Sheets

U.S. PATENT DOCUMENTS

| | | |
|---|---|---|
| 5,511,073 A | 4/1996 | Padovani et al. |
| 5,528,593 A | 6/1996 | English et al. |
| 5,548,616 A | 8/1996 | Mucke et al. |
| 5,590,408 A | 12/1996 | Weiland et al. |
| 5,629,934 A | 5/1997 | Ghosh et al. |
| 5,655,220 A | 8/1997 | Weiland et al. |

FOREIGN PATENT DOCUMENTS

| | | |
|---|---|---|
| EP | 06087245 | 10/1995 |
| EP | 0680159 | 11/1995 |
| JP | 890169915 | 2/1991 |
| WO | 9406218 | 3/1994 |

* cited by examiner

METHOD AND APPARATUS FOR PERFORMING FAST POWER CONTROL IN A MOBILE COMMUNICATION SYSTEM This is a Continuation Application of U.S. Serial application Ser. No. 08/559,386, filed Nov. 15, 1995, now issued as U.S. Pat. No. 6,137,840, which is a Continuation-In-Part Application of U.S. application Ser. No. 08/414,633, filed Mar. 31, 1995 now abandoned, and the File-Wrapper Continuation of Ser. No. 08/958,822, filed Oct. 27, 1997 now issued as U.S. Pat. No. 6,035,209, and entitled "Method and Apparatus for Performing Fast Forward Power Control in a Mobile Communication System.

BACKGROUND OF THE INVENTION

I. Field of the Invention

The present invention relates to communication systems. More particularly, the present invention relates to a novel and improved method and apparatus for controlling transmission power in a mobile communication system.

II. Description of the Related Art

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM", and U.S. Pat. No. 5,109,390 entitled "DIVERSITY RECEIVER IN A CDMA CELLULAR TELEPHONE SYSTEM", both assigned to the assignee of the present invention and incorporated by reference herein.

A method for transmission of speech in digital communication systems that offers particular advantages in increasing capacity while maintaining high quality of perceived speech is by the use of variable rate speech encoding. The method and apparatus of a particularly useful variable rate speech encoder is described in detail in U.S. Pat. No. 5,414,796, entitled "VARIABLE RATE VOCODER", assigned to the assignee of the present invention and incorporated by reference herein.

The use of a variable rate speech encoder provides for data frames of maximum speech data capacity when said speech encoding is providing speech data at a maximum rate. When a variable rate speech coder is providing speech data at a less than maximum rate, there is excess capacity in the transmission frames. A method for transmitting additional data in transmission frames of a fixed predetermined size, wherein the source of the data for the data frames is providing the data at a variable rate is described in detail in copending U.S. Pat. No. 5,504,773, entitled "METHOD AND APPARATUS FOR THE FORMATTING OF DATA FOR TRANSMISSION", assigned to the assignee of the present invention, of which the disclosure thereof is incorporated by reference herein. In the above-mentioned patent application a method and apparatus is disclosed for combining data of differing types from different sources in a data frame for transmission.

In frames containing less data than a predetermined capacity, power consumption may be lessened by transmission gating a transmission amplifier such that only parts of the frame containing data are transmitted. Furthermore, message collisions in a communication system may be reduced if the data is placed into frames in accordance with a predetermined pseudorandom process. A method and apparatus for gating the transmission and for positioning the data in the frames is disclosed in U.S. Pat. No. 5,659,569, entitled "DATA BURST RANDOMIZER", assigned to the assignee of the present invention, of which the disclosure thereof is incorporated by reference herein.

A useful method of power control of a mobile in a communication system is to monitor the power of the received signal from the mobile station at a base station. The base station in response to the monitored power level transmits power control bits to the mobile station at regular intervals. A method and apparatus for controlling transmission power in this fashion is disclosed in U.S. Pat. No. 5,056,109, entitled "METHOD AND APPARATUS FOR CONTROLLING TRANSMISSION POWER IN A CDMA CELLULAR MOBILE TELEPHONE SYSTEM", assigned to the assignee of the present invention, of which the disclosure thereof is incorporated by reference herein.

In a communication system that provides data using a QPSK modulation format, very useful information can be obtained by taking the cross product of the I and Q components of the QPSK signal. By knowing the relative phases of the two components, one can determine roughly the velocity of the mobile station in relation to the base station. A description of a circuit for determining the cross product of the I and Q components in a QPSK modulation communication system is disclosed in U.S. Pat. No. 5,506,865, entitled "PILOT CARRIER DOT PRODUCT CIRCUIT", assigned to the assignee of the present invention, the disclosure of which is incorporated by reference herein.

In an alternative continuous transmission strategy, if the data rate is less than the predetermined maximum, then the data is repeated within the frame such that the data occupies the full capacity of the data frame. If such a strategy is employed, power consumption and interference to other users may be reduced during periods of data transmission at less than the predetermined maximum by reducing the power at which the frame is transmitted. This reduced transmission power is compensated by the redundancy in the data stream and can offer benefits in range for a fixed maximum transmission power.

A problem that is encountered in controlling transmission power in the continuous transmission strategy is that the receiver does not know the transmission rate a priori and as a result does not know the power level that should be received. The present invention provides a method and apparatus for controlling transmission power in a continuous transmission communication system.

SUMMARY OF THE INVENTION

The present invention is a novel and improved method and apparatus for closed loop transmission power control in a communication system. It is an object of the present invention to provide timely power control that is necessary to provide robust communication link quality under fading conditions.

In a mobile communications environment, the fading conditions of a propagation path change rapidly. This phenomenon is described in detail in the aforementioned U.S. Pat. No. 5,056,109. Communications stations must be able to respond to these sudden changes in the propagation path. The present invention provides a method and apparatus for responding to the rapid changes in the communications channel of a mobile communication system.

In a code division multiple access (CDMA) communication system, the methods described herein have special significance, because by reducing the transmission power to the minimum necessary for high quality communications, the communication system provides less interference to the transmissions of other users and allows an increase in overall system capacity. In addition, in a capacity limited system, the power reduction of transmission to one user allows another user to transmit at a higher power level which may be necessary due to differences in the propagation path or because that user is transmitting at a higher data rate.

Further, it should be noted that power control techniques are presented in the exemplary embodiment in a spread spectrum communication system, however, the methods presented are equally applicable for other communication systems. Also, the exemplary embodiment used for the control of transmission power in transmissions from a base station to a remote or mobile station may be applied to the control of transmission power in transmissions from a remote or mobile station to a base station.

In the exemplary embodiment, a base station transmits packets of data to a mobile station. The mobile station receives, demodulates and decodes the received packet. If the mobile station determines that the received packet cannot be reliably decoded, it sets the normally '0' quality response power control bit to '1' indicating the situation to the base station. In response, the base station increases the transmission power of the signal to the mobile station.

In the exemplary embodiment of the present invention, when the base station increases its transmission power it does so with a relatively large step in transmission power which is assumed to be more than adequate under most fading conditions. The base station then decreases the transmission power level at an exponentially decreasing rate as long as the quality response power control bits remain at '0'. In an alternative embodiment, the base station responds to a request from the mobile station for additional signal power by increasing the signal power incrementally.

In an improved embodiment of this power control system, the base station will determine whether the error reported by the mobile station was of a random nature in which case it will immediately begin ramping down the transmission power or whether the error was an error resulting from a genuine fading condition. The base station distinguishes errors of a random nature from those of a prolonged nature by examining the patterns of power control bits sent by the mobile station. If the pattern of power control request signals that the mobile station transmits back to the base station indicates that there is a new fading condition present in the propagation path, then the base station will refrain from decreasing the transmission power.

In an improved embodiment, the bases station examines the pattern of incoming power control messages to determine characteristics of the fade. The estimation of the fading characteristics can be used to estimate the power control changes that need to be made. This could be achieved for example by making the power control in the base station predictive.

One of the identified sources of sudden changes in the propagation path of a mobile station is a change in velocity relative to the position of the base station. That is, if the velocity towards the mobile station or away from the mobile station is changing. In the present invention, the mobile station determines that the velocity relative to the base station is changing, and if necessary, sets the power control bits to request additional power from the base station to accommodate the change in velocity.

In a first exemplary embodiment, the mobile station is equipped with a motion sensor which may operate off of information from the speedometer or tachometer in the case of an automobile based mobile station. The mobile station then generates the power control signal in accordance with the signal from the motion sensor.

In a second exemplary embodiment, the mobile station may sense a shift in the received signal from the base station in order to sense motion. In the exemplary embodiment, the mobile station determines the changes in relative velocity by measuring the Doppler shift in the received pilot signal.

The present invention also provides a method and apparatus for controlling transmissions power levels of variable rate transmissions. This method broadcasts the variable rate frames of data at different power levels depending on the rate of the transmission. A plurality of implementations are disclosed for adjusting the transmission power levels in a variable rate communication system.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE
PREFERRED EMBODIMENTS

Figure 1:
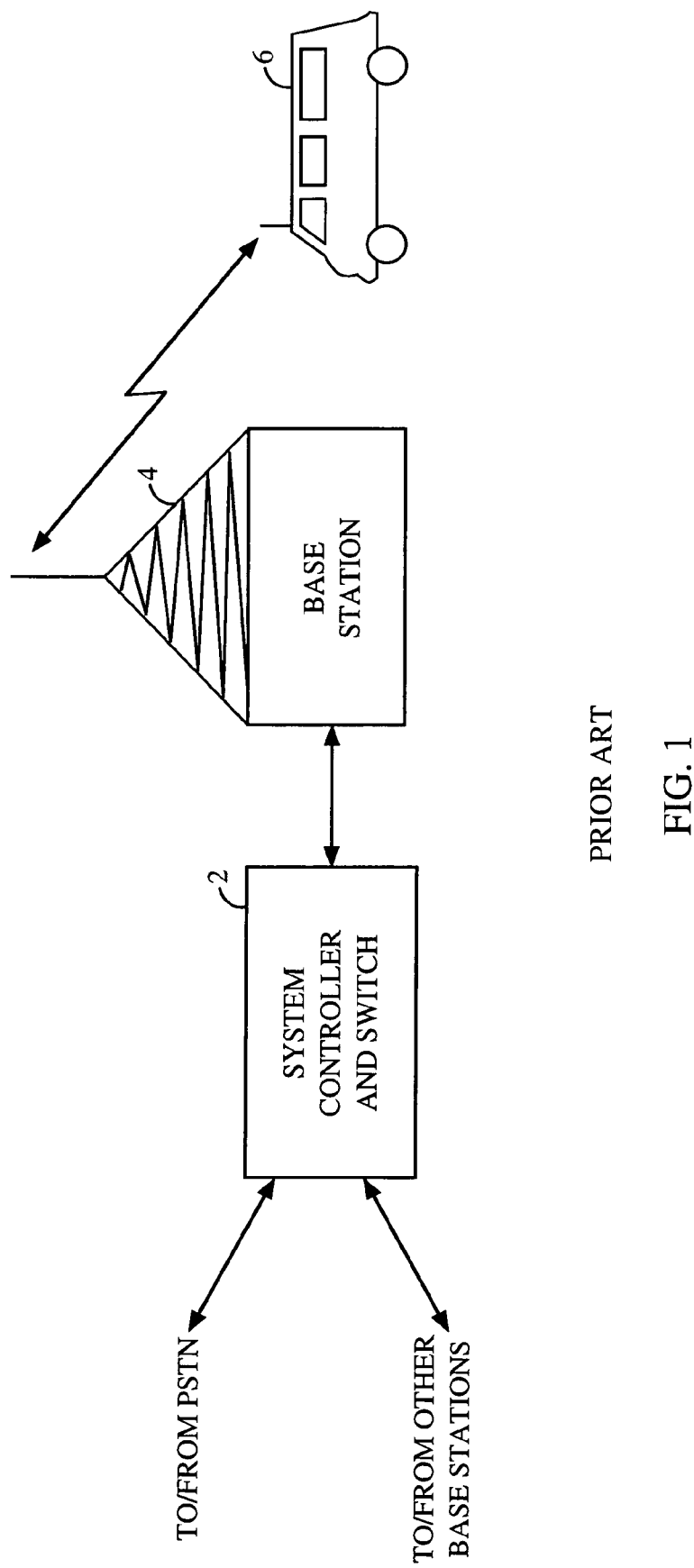
FIG. 1 is an illustration of an exemplary mobile telephone system.

Referring to FIG. 1, the present invention is illustrated in an exemplary implementation in a mobile communication system for controlling the power of transmissions between base station 4 and mobile station 6. Information may be provided to and from a public switched telephone network (PSTN) to system controller and switch 2, or may be provided to and from controller and switch 2 by another base station if the call is a mobile station to mobile station communication. System controller and switch 2, in turn, provides data to and receives data from base station 4. Base station 4 transmits data to and receives data from mobile station 6.

In the exemplary embodiment the signals transmitted between base station 4 and mobile station 6 are spread spectrum communication signals, the generation of the waveforms of which are described in detail in the above mentioned U.S. Pat. No. 4,901,307 and U.S. Pat. No. 5,103,459. The transmission link for communication of messages from mobile station 6 to base station 4 is referred to as the reverse link and the transmission link for communication of messages from base station 4 to mobile station 6 is referred to as the forward link. In the exemplary embodiment, the present invention is used to control the transmission power of base station 4. However, the methods of power control of the present invention are equally applicable to controlling the transmission power of mobile station 6.

Figure 2:
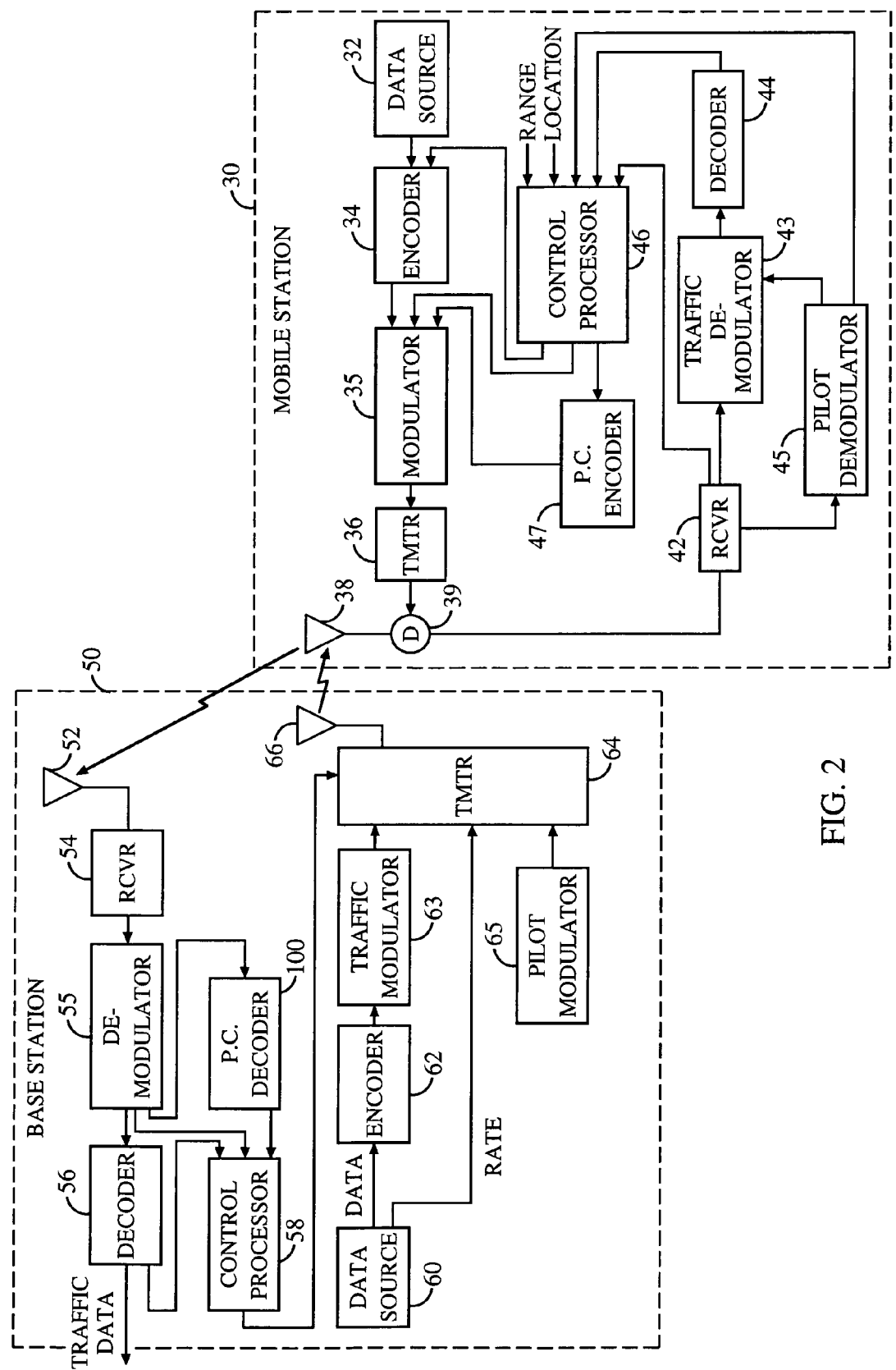
FIG. 2 is an illustration of the apparatus of the present invention.

Referring to FIG. 2, base station 50 and mobile station 30 are illustrated in block diagram form showing the apparatus for providing control of the transmission power of base station 50 of the present invention. If a communication link degrades, then the link quality can be improved by increasing the transmission power of the transmitting device. In the exemplary embodiment of controlling transmission power of base station 50, some of the methods for determining that the transmission power of base station 50 should be increased include:

(a) mobile station detection of frame errors on forward link;
(b) mobile station detects that received power is low on forward link;
(c) mobile station to base station range is large;
(d) mobile station location is poor;
(e) mobile station change in velocity;
(f) mobile station detects that received power on pilot channel is low on forward link;
(g) $E_c/N_0$ is low, where $E_c/N_0$ is the energy per chip on either the traffic or pilot channel divided by the total received power; and
(h) decoder metrics, such as symbol metrics, are high.

Conversely, some of the methods for determining that the transmission power of base station 50 should be decreased include:

(a) mobile station quality responses to the base station show a low frame error rate for the forward link;
(b) mobile station detects that received power is high on forward link;
(c) base station to mobile station range is low;
(d) mobile station location is good;
(e) mobile station detects that received power on forward link pilot channel is high; and
(f) decoder metrics, such as symbol metrics, are low.

When base station 50 detects a need to modify the transmission power of the forward link, control processor 58 sends a signal specifying a modified transmission power to transmitter (TMTR) 64. The modified power signal may simply indicate a need to increase or decrease the transmission power or it may indicate an amount to change the signal power or it may be an absolute signal power level. In response to the modified power level signal, transmitter 64 provides all transmissions at the modified transmission power level.

It should be noted that data source 60 may source modem, facsimile or speech data. Data source 60 may be a variable rate source that varies its transmission rate on a frame to frame basis throughout the transmission or it may be able to vary rates only upon command. In the exemplary embodiment, data source 60 is a variable rate vocoder. The design and implementation of a variable rate speech vocoder are described in detail in the aforementioned U.S. Pat. No. 5,414,796. The output from data source 60 is encoded by encoder 62 and input to traffic modulator 63 for modulation and input to transmitter 64. Also input to pilot modulator 65 is a synchronous pilot signal for transmission.

A need for modification of the transmission power may be indicated by any one of the conditions enumerated above or by any combination of those conditions. If the method of power control is based upon a position related effect such as range or mobile station location, then an external signal (LOCATION) is provided to control processor 58 of base station 50 indicative of the location condition. The range condition can be detected by base station 50. In an alternative embodiment, the range condition can be detected by mobile station 30 and transmitted to base station 50. In response to the detected range condition control processor 58 in base station 50 generates a control signal for modifying transmission power of transmitter 64.

In a closed loop power control implementation, power control signals are provided from mobile station 30 to base station 50. Mobile station 30 may determine the power control signal in accordance with received power or alternatively in accordance with the detection of frame errors or any other method previously discussed. The present invention is equally applicable to any link quality factors.

If the link quality factor used is received power, then the signal from base station 50 received at mobile station 30 by antenna 38 is provided to receiver (RCVR) 42 which provides an indication of the received power to control processor 46. If the link quality factor used is the detection of frame errors, then receiver 42 downconverts and amplifies the signal providing the received signal to traffic demodulator 43. If the traffic signal is accompanied by a pilot signal in order to provide for coherent demodulation then the received signal is also provided to pilot demodulator 45 which demodulates the signal in accordance with a pilot demodulation format and provides a timing signal to traffic demodulator 43. Traffic demodulator 43 demodulates the received signal in accordance with a traffic demodulator format. In the exemplary embodiment, traffic demodulator 43 and pilot demodulator 45 are CDMA spread spectrum demodulators, the design of which is described in the aforementioned U.S. Pat. Nos. 4,901,307 and 5,103,459. Traffic demodulator 43 provides the demodulated signal to decoder 44. In a first exemplary embodiment, decoder 44 performs error—detection decoding to determine if errors have occurred. Error detection/correction decoders, such as the Viterbi trellis decoder, are well known in the art. In an alternative embodiment, decoder 44 decodes the demodulated signal and then re-encodes the decoded signal. Decoder 44 then compares the re-encoded signal with the demodulated signal to obtain an estimate of the channel symbol error rate. Decoder 44 provides a signal indicating an estimated channel symbol error rate to control processor 46.

Control processor 46 compares the received power or estimated channel symbol error rate referred to generically as the link quality factor against a threshold or set of thresholds which may be static or varying. Control processor 46, then provides the power control information to either encoder 34 or power control encoder (P.C. ENC.) 47. If the power control information is to be encoded into the data frame, then the power control data is provided to encoder 34. This method requires that an entire frame of data be processed before transmitting the power control data, then encoded traffic data containing power control data are provided to transmitter (TMTR) 36 through modulator 35. In an alternative embodiment, the power control data may simply overwrite portions of the data frame or may be placed in predetermined vacant positions in the transmission frame. If the power control data overwrites traffic data, then this may be corrected by forward error correction techniques at base station 50.

In implementations that process a full frame of data before providing the power control data, the delay waiting for a full frame to be processed is undesirable in fast fade conditions. The alternative is to provide the power control data directly to modulator 35 where it may be punctured into the outgoing data stream. If the power control data is transmitted without error correction coding then control processor 46 outputs the power control data directly to modulator 35. If error correction coding is desired for the power control data, control processor 46 outputs the power control data to power control encoder 47 which encodes power control data without regard to the outgoing traffic data. Power control encoder 47 provides the encoded power control signal to modulator 35 which combines the encoded power control signal with the outgoing traffic data provided from data source 32 through encoder 34 to modulator 35. Transmitter 36 upconverts and amplifies the signal and provides it to antenna 38 for transmission to base station 50.

The transmitted signal is received at antenna 52 of base station 50 and provided to data receiver (RCVR) 54 where it is downconverted and amplified. Receiver 54 provides the received signal to demodulator 55 which demodulates the received signal. In the exemplary embodiment, demodulator 55 is a CDMA spread spectrum demodulator which is described in detail in the aforementioned U.S. Pat. Nos. 4,901,307 and 5,103,459. If the power control data is encoded within a frame of traffic data, then the traffic and power control data is provided to decoder 56. Decoder 56 decodes the signal and separates the power control signal from the traffic data.

If, on the other hand the power control data is not encoded with a full frame of data but rather punctured into the transmission stream of data, then demodulator 55 demodulates the signal and extracts the power control data from the incoming data stream. If the power control signal is not encoded then demodulator 55 provides the power control data directly to control processor 58. If the power control signal is encoded then demodulator 55 provides the encoded power control data to power control decoder (P.C. DEC.) 100. Power control decoder 100 decodes the power control data and provides the decoded power control data to control processor 58. The power control signal is provided to control processor 58, which in accordance with the power control signal provides a control signal to transmitter 64 indicative of a modified transmission power level.

One of the inherent problems with closed-loop power control systems is a relatively slow response time, relative to an open-loop power control system. For example, in a closed-loop power control system, when base station 50 transmits a frame at an insufficient transmission energy to mobile station 30, mobile station 30 receives and decodes the frame, determines whether the frame is in error, prepares a power control message indicating the frame error, then transmits the power control message to base station 50, which decodes the frame, extracts the power control message and adjusts the transmission power of transmitter 64. In the exemplary embodiment, this results in a four frame time lag before correction is apparent at mobile station 30. Thus, if the propagation path has deteriorated, four consecutive frames would be transmitted at the insufficient frame energy before a frame is transmitted at the adjusted frame energy. In this delay period the fading condition may have substantially improved or deteriorated.

The following are methods by which to improve the responsiveness of a closed loop power control system. In a first exemplary embodiment of the present invention, the base station assumes the worse case. Which is that the propagation path has deteriorated during the four frame delay period. In response the base station increases the transmission energy to that user by a relatively significant amount ΔE so that the adjustment will be more than adequate to assure that the power adjusted frame will be properly received even if the propagation path has deteriorated in the interim. In the exemplary embodiment of a spread spectrum communication system, this increase in power to mobile station 30 causes less power to be available for other users who share the forward link. So the base station transmitter quickly reduces the transmission energy for that user following the initial increase. In the exemplary embodiment, the base station increases the energy by a fixed amount ΔE and holds that value for a delay period to verify that the increase in transmission energy has been effective and then decreases the transmission energy in accordance with a predetermined piecewise linear function as illustrated in FIG. 3.

Figure 3:
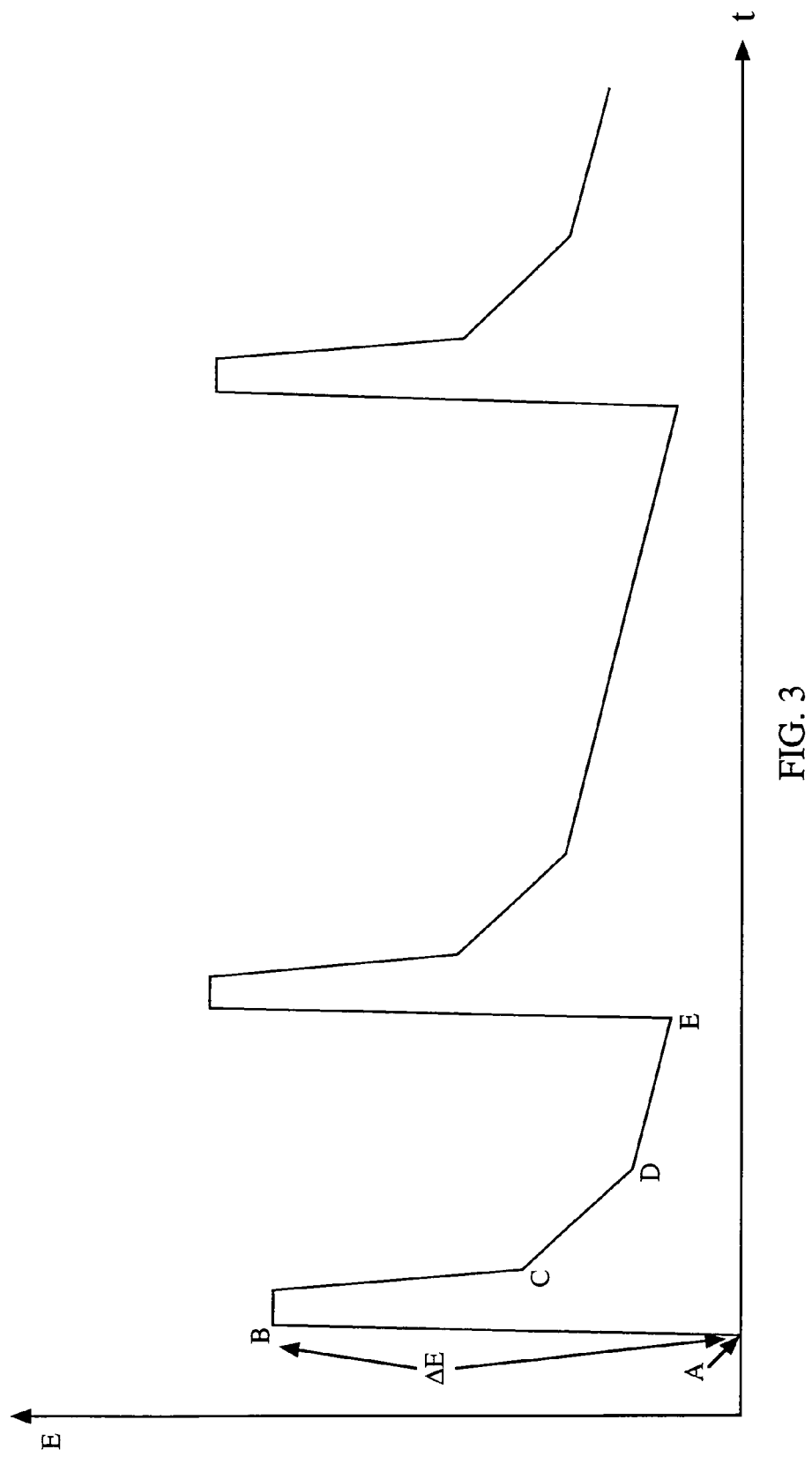
FIG. 3 is an illustration of a curve illustrating the delay time entailed in a closed loop power control system.

FIG. 3 illustrates a plot of the transmission energy (E) against time. At point A the base station 50 increases the transmission energy in response to a power adjustment request from mobile station 30. Base station 50 increases the transmission energy by an amount ΔE to point B. Base station 50 holds transmission at that transmission energy for a predetermined delay period then reduces the transmission energy at a swiftly decreasing rate for a predetermined number of frames to point C. At point C, if the power control message from mobile station 30 still indicates an excess of transmission energy, base station 50 continues to decrease the transmission energy, however, the rate of the decrease is less. Again, base station 50 decreases at this intermediate rate of decrease for a predetermined number of frames until point D. At point D the rate of decrease is again reduced to a final decreasing rate at which the transmission energy will continue to be decreased until base station 50 reaches some minimum value or it is alerted again by another power adjustment request from mobile station 30, which occurs at point E. This power adjustment continues throughout the duration of the service provided.

In an improved embodiment, the transmit power can also be decreased by a larger amount should the pattern of incoming power control messages indicates that the transmission power is unnecessarily high. In the exemplary embodiment, control processor 58 includes a timer (not shown). The timer is reset each time a power control message is received indicating a received frame error. Should the timer elapse without receipt of another power control message indicating a received frame error, then control processor 58 directs transmitter 64 to drop the transmission of outgoing frames by a larger amount than the incremental decrease.

Base station 50 performs the adjustment of the transmission energy with knowledge that after the transmission energy has been increased there will be a delay before the received power control information will reflect the change in the forward link transmission power. If the propagation channel suddenly worsens, base station 50 will receive a series of consecutive power control requests, and there will be a delay before the power adjustment requests are responsive to the change in forward link transmission energy. During this delay period, base station 50 should not continue to increase the transmission energy for each received power adjustment request. This is the reason that the power level is held constant for a predetermined delay period as illustrated in the period following point B of FIG. 3.

It should also be noted that errors in a mobile communication system come in two types. Those that are random and those that are the result of a change in the propagation path. In the exemplary embodiment, when base station 50 receives a power adjustment request, it increases the transmission power by ΔE as described previously. Then it ignores the power adjustment requests and retains the same increased power level for the delay period. In an alternative embodiment, base station 50 adjusts the power in accordance with each power control message. However, smaller changes would typically be used. This minimizes the impact of random errors.

One of the main influences that results in changes in the characteristics of the propagation path between mobile station 30 and base station 50 is motion by mobile station 30 towards or away from base station 50. Mobile station 30 may provide base station 50 with information indicating that the mobile station velocity is changing or it may actually provide its velocity relative to base station 50. If the mobile station is simply providing an indication that its velocity is changing, it may provide that information as a power adjustment request signal in anticipation of a change in the quality of the propagation path.

In a first embodiment, mobile station 30 may sense the change in velocity by providing a sensor to operate in accordance with a signal from the automobile tachometer or speedometer (not shown). In an alternative embodiment, mobile station 30 determines either a change in the mobile/base station relative velocity or absolute velocity by changes in the received signal from base station 50. Mobile station 30 may detect a change in velocity or measure the absolute relative velocity by measuring the Doppler effect on the incoming signal from base station 50. In an alternative embodiment, base station 50 may also detect a change in the mobile/base station relative velocity or measure the absolute relative velocity by measuring the Doppler effect on the incoming signal from mobile station 30.

The traffic signal provided by base station 50 may be accompanied by a pilot signal in order to provide for coherent demodulation of the received traffic signal. Use of a pilot signal is described in U.S. Pat. Nos. 4,901,307 and 5,103,459, and mobile station 30 can alternatively sense changes in the relative velocity or the Doppler shift of the pilot signal.

In a preferred embodiment, when base station 50 knows the velocity of mobile station 30, the value of the incremental change in transmission energy, ΔE, will vary in accordance with this velocity. The determination of the value of ΔE may be performed algorithmically or by a lookup table in control processor 46.

If base station 50 transmits a pilot signal along with the traffic signal, the pilot signal can be thought of as a traffic signal that carries a predetermined bit stream known by mobile station 30. Mobile station 30 demodulates the pilot channel in pilot demodulator 45 in order to get timing information to enable mobile station 30 to perform coherent demodulation of the traffic channel. Because the pilot channel and the traffic channel are provided through similar if not identical propagation paths, there is a strong correlation between the strength of the received pilot signal and the strength of the received traffic signal. By basing the generation of the power control signal on the pilot channel instead of the traffic channel, the delay between receiving the signal transmitted from base station 50 and generating the power control signal may be reduced.

Referring to FIG. 2, pilot modulator 65 provides a pilot signal to transmitter 64 and transmitter 64 of base station 50 provides the pilot signal along with the traffic signal to antenna 52 for broadcast to mobile station 30. The transmitted signal is received at antenna 38 and provided to receiver 42. Receiver 42 downconverts and amplifies the pilot signal and provides the received pilot signal to pilot demodulator 45 which generates a quality estimate of the demodulated pilot signal and provides it to control processor 46. Control processor 46 generates a power control signal in accordance with the quality estimate of the demodulated pilot signal and the operation proceeds as described previously.

In forward link transmissions being broadcast from base station 50 to mobile station 30, it is beneficial to minimize the transmitted power while maintaining the modem performance. In the exemplary embodiment of a code division multiple access (CDMA) communication system, this minimization of transmission power leaves more power for other channels using the same power amplifier, while reducing interference to other users and systems on the same and near-by frequencies.

In the exemplary embodiment of a mobile communication system with variable-rate transmissions, the performance difference between the possible rates can be significant. For example, the transmission power level of frames from base station 50, required to achieve a given frame error rate (FER) can vary greatly among the rates. This is illustrated in FIG. 4a. FIG. 4a shows the variation of frame error rates v. the bit energy normalized by the noise energy ($E_b/N_o$).

In the exemplary embodiment, data is transmitted in frames. The present invention is equally applicable to continuous transmission systems. The present invention is illustrated in an exemplary implementation of a variable rate communication system having four possible rates. In the exemplary embodiment, those rates are designated as full rate, half rate, quarter rate and eighth rate. The present invention is equally applicable to any variable rate communication system which supports any number of possible rates.

FIG. 4a illustrates that the required bit energy for a given frame error rate depends strongly upon the rate of the frame, with full rate frames requiring the highest bit energy and eighth rate frames requiring the lowest amount of bit energy. Thus, in the present invention the transmission power required for the desired performance level is set separately to take advantage of the differences in required minimum power between the respective rates. In addition, the necessary performance for the different rates can also be different, since the effect of a frame error on perceptual quality differs depending on the rate of the frame. For example, a higher frame error rate may be more acceptable for eighth rate frames than for full rate frames.

Figure 4B:
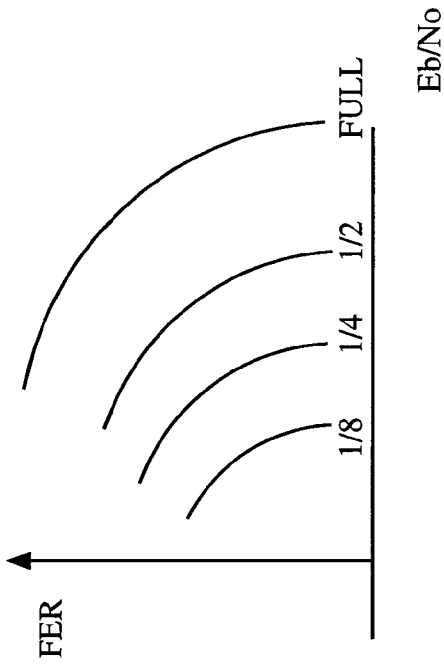
FIGS. 4*a*–*b* is an illustration of plots of the frame error rate v. normalized bit energy for different rates; wherein FIG. 4*a* the mobile station is stationary and in FIG. 4*b* the mobile station is in motion in FIG. 4B.
Figure 4A:
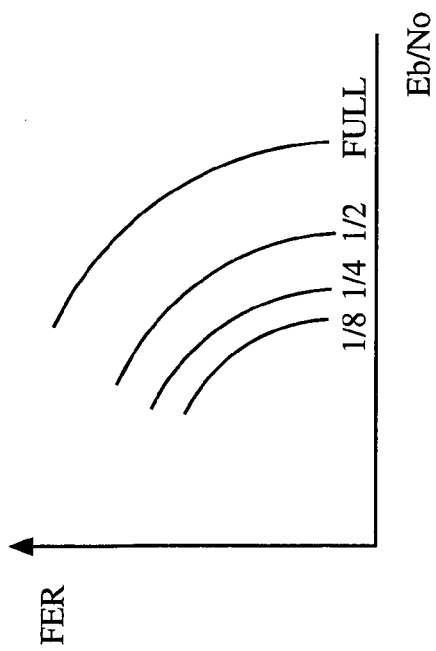

FIG. 4b is provided to show that the required bit energy for a desired performance level can vary with time and conditions of usage. For example, when mobile station 30 is in motion relative to base station 50, the required bit energies will vary more between the rates than when mobile station 30 is standing still. FIG. 4b is provided to illustrate the waterfall curves when mobile station 30 is in motion. Whereas FIG. 4a is provided to show the waterfall curves for the same mobile station 30 communicating with the same base station 50 except that mobile station 30 is not in motion. It is because of this variance that the present invention provides a means for varying the level of difference between the transmission power of the various rates.

The present invention discloses a variety of ways to apply fast power control on the forward link, utilizing the difference in the required power. It should be noted that each of the methods can be used in conjunction with any of the power control techniques described above.

Moreover, the present invention is also applicable for taking advantage of the different desired performance at different rates. For example, a frame error rate of 1% may be required of full rate frames because those are the most perceptually significant frames. However, a frame error rate of 4% may be acceptable for eighth rate frames which primarily carry background noise information. The methods disclosed in the previous invention can easily account for these different frame error rates simply by adjusting threshold values used to determine the necessity of increasing or decreasing the transmission power.

The general power control method adjusts the transmission power level based on feedback from mobile station 30 of the occurrence of frame errors. However, these methods are equally applicable to any of the power control methods described above, such as those based on physical location or received power. In these exemplary embodiments, the mobile station 30 is described as sending a frame quality indicator that indicates whether the previous frame was received and properly decoded or whether a frame error occurred. The system is equally applicable in communication systems where feedback is provided from mobile station 30 in the eventuality of a frame error, simply by attributing the absence of frame error indicator as equal to a frame quality indicator indicative of a properly received frame.

In the exemplary embodiments, the frame quality indicator signal is fed back from mobile station 30. This frame quality indicator corresponds to a previously transmitted frame from base station 50. The rate of the frame transmitted by base station 50 is referred to herein as the frame quality indicator rate. In the exemplary embodiments, base station 50 knows the frame quality indicator rates, because it knows the rates of frames which it transmits and the round trip delay time from the sending of a message from base station 50 to mobile station 30, and the time for mobile station 30 to generate the frame quality indicator signal and transmit that signal back to base station 50. The present invention is equally applicable to systems where mobile station 30 transmits an indication of the frame rate along with the frame quality indicator signal.

The first exemplary embodiment of methods utilizing the differences in required power between rates is referred to herein as the single loop, fixed difference method. In this exemplary embodiment, one rate serves as the reference rate. The transmission power level of the reference rate is actively tracked by control processor 58 to directly adjust the transmission power of frames at that reference rate. The transmission power of the other rates are determined dependent upon the transmission power of the reference rate.

The power levels for each of the other rates are determined in accordance with the level of the reference rate, so as to keep the performance at the required levels. Since the performance for every frame is estimated to be similar regardless of the rate, the feedback about the actual performance of each frame is given uniform significance regardless of the rate of the frame to which it corresponds and can be used indiscriminately in making adjustments to the reference rate.

In the exemplary implementation, there are four possible rates as described above (full, half, quarter and eighth rates). In the exemplary embodiment, the reference rate is full rate and the power level of half rate is set to be 1 dB below the power level of the full rate, quarter rate is 1.5 dB below the power level of the full rate and the eighth rate is 1.8 dB below the power level of the full rate. Control processor 58 determines the power level for each of the rates based on the feedback from mobile station 30 as described below and provides this information to variable gain transmitter 64. Transmitter 64 sets the transmit power for outgoing frames in accordance with this signal and the rate of the frame. Transmitter 64 is provided with a signal from variable rate data source 60 indicative of the rate of the outgoing frames.

Figure 5:
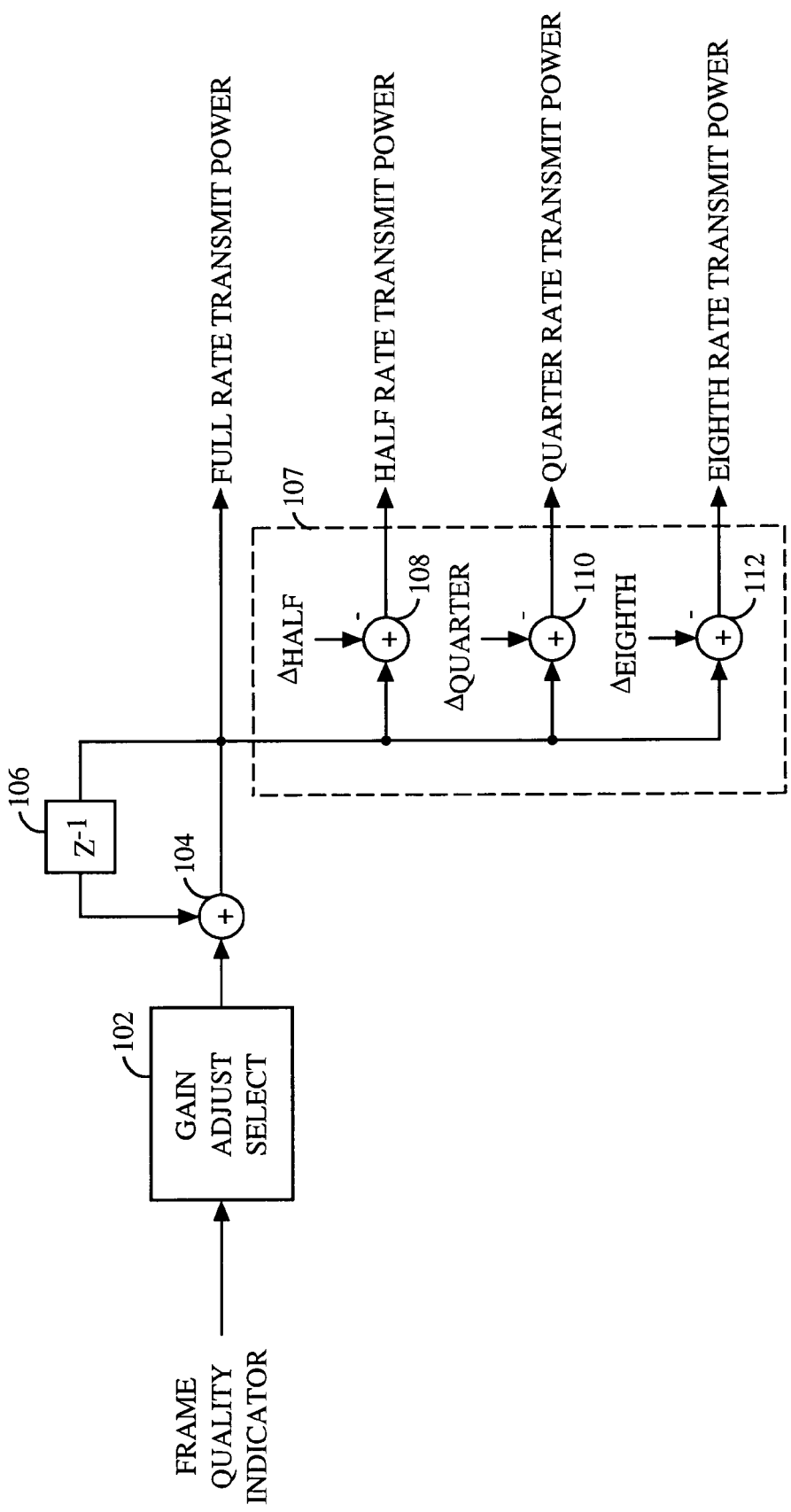
FIG. 5 illustrates an exemplary embodiment of the control processor for a single loop fixed difference implementation.

FIG. 5 illustrates an exemplary embodiment of control processor 58 for the implementation of the single loop and fixed difference power control method. The frame quality indicator (FQI) message received from mobile station 30 is provided to gain adjust selector 102. Gain adjust selector 102 can be implemented by programming of a microprocessor, micro controller or logic array as is well known in the art.

In the exemplary embodiment, the FQI message has one of two possible values. It is either a zero indicating correct reception of the frame by mobile station 30 or a one indicating the occurrence of a frame error. In the exemplary embodiment, gain adjust selector 102 outputs a selected gain adjustment value in accordance with equation (1) below:

$$\text{if } FQI = \begin{cases} 1, \text{ then } GA = +1.0 \\ 0, \text{ then } GA = -0.01 \end{cases} \quad (1)$$

where GA is the gain adjustment output by gain adjust selector 102.

These numbers are selected on the basis of an acceptable frame error rate of 1%. That is why the ratio of the decrease to the increase is one hundred. These values are purely exemplary in nature and will vary depending on the implementation and the desired performance of the system.

It should also be noted that the present invention is equally applicable to systems where the feedback specifies more information than can be contained in one bit of information. In those cases the gain adjustment values can have more then two possible values, which will be selected depending upon the value of the FQI message. The FQI message can be any one of the indicators enumerated previously in the application.

The gain adjustment (GA) value is provided to one input of summing element 104. The value provided to the other input of summing element 104 is the current transmit power level of the reference rate. In the exemplary embodiment, the reference rate is full rate. The output of summing element 104 is the adjusted reference rate transmit power level. This value is provided to variable gain transmitter 64, which will amplify full rate frames in accordance with this value.

The output of summing element 104 is, also, fed back to the input of delay element 106. Delay 106, in the exemplary embodiment, delays the input to summing element 104 by the period of time between separate arrivals of frame quality indicator messages. In the exemplary embodiment the delay is 20 ms. The implementation of such delays is well known in the art.

The transmit power levels of the other rates are determined based upon the power level of the reference rate transmit power level. The full rate transmit power is provided to dependent transmit power calculator 107, which determines the half rate, quarter rate and eight rate transmit power levels in accordance with the full rate transmit power in accordance with a predetermined calculation format. In the exemplary embodiment, dependent transmit power calculator 107 is implemented by programming a microprocessor, microcontroller or logic array which is well known in the art.

In the exemplary embodiment of dependent transmit power calculator 107, the half rate, quarter rate and eight rate transmit power levels are a fixed difference from the full rate transmit power. So in the exemplary embodiment, the full rate transmit power level is provided to a summing input of summing element 108. The value $\Delta_{half}$ is provided to a subtracting input of summing element 108. In the exemplary embodiment, $\Delta_{half}$ is equal to 1 dB. The value outputted by summing element 108 is the half rate transmit power which in the exemplary embodiment is 1 dB less than the power level of full rate frames. This value is provided to variable gain transmitter 64, which amplifies half rate frames in accordance with this value.

It should be noted that in a practical implementation of the present invention the operation need not be performed by addition. For example, typically the half rate transmit power 3 dB less than the full rate transmit power. Thus, the half rate transmit power is can be computed in absolute terms by dividing the full rate transmit power by two as opposed to subtracting 3 dB from the full rate transmit power.

Similarly, the full rate transmit power level is provided to a summing input of summing element 110. The value $\Delta_{quarter}$ is provided to a subtracting input of summing element 110. In the exemplary embodiment, $\Delta_{quarter}$ is equal to 1.5 dB. The value outputted by summing element 110 is the half rate transmit power. This value is provided to variable gain transmitter 64, which amplifies quarter rate frames in accordance with this value.

Lastly, the full rate transmit power level is provided to a summing input of summing element 112. The value $\Delta_{eighth}$ is provided to the subtracting input of summing element 112. In the exemplary embodiment, $\Delta_{quarter}$ is equal to 1.8 dB.

The value output by summing element 112 is the eighth rate transmit power which is 1.8 dB less than the power level of full rate frames. This value is provided to variable gain transmitter 64, which amplifies eighth rate frames in accordance with this value.

It should be noted that all of the delta values ($\Delta_{half}$, $\Delta_{quarter}$ and $\Delta_{eighth}$) provided above are purely for exemplary purposes and that other values are equally applicable and are anticipated by the present invention.

The second exemplary embodiment of methods utilizing the differences in required power between rates is referred herein as single loop, variable difference method. This exemplary embodiment attempts to keep the performance at each of the rates within its respective range. However, the difference between the transmit power of the dependent rates and the reference rate adapts based on information compiled by the individual rates, for example the moving average of individual frame error rates. As the performance for a rate other than the reference rate deviates from the desired level, its power level difference from the reference level is modified to negate the deviation. If the performance of the reference rate deteriorates the power level difference for all or some other rates are modified.

In the exemplary implementation, control processor 58 tracks the performance (e.g., number of frame erasures in the last 100 frames) for each of the rates. For example, if the eighth rate performance falls below the desired performance level, the difference between the eighth rate power level and the reference rate power level is reduced, effectively increasing the eighth rate power level, if the eighth rate power level is lower than the reference power level.

In the exemplary implementation, data source 60 provides a signal indicative of the rate of an outgoing frame to control processor 58, by which control processor 58 determines the rates of the frame quality indicator messages. FIG. 5 shows a single stage filter comprised of elements 104 and 106. The present invention could be more complex wherein the modified full rate transmit power could depend on a plurality of past generated full rate transmit power values. The design and implementation of such digital filters are well known in the art and described in detail in the aforementioned U.S. Pat. No. 5,414,796.

Figure 6:
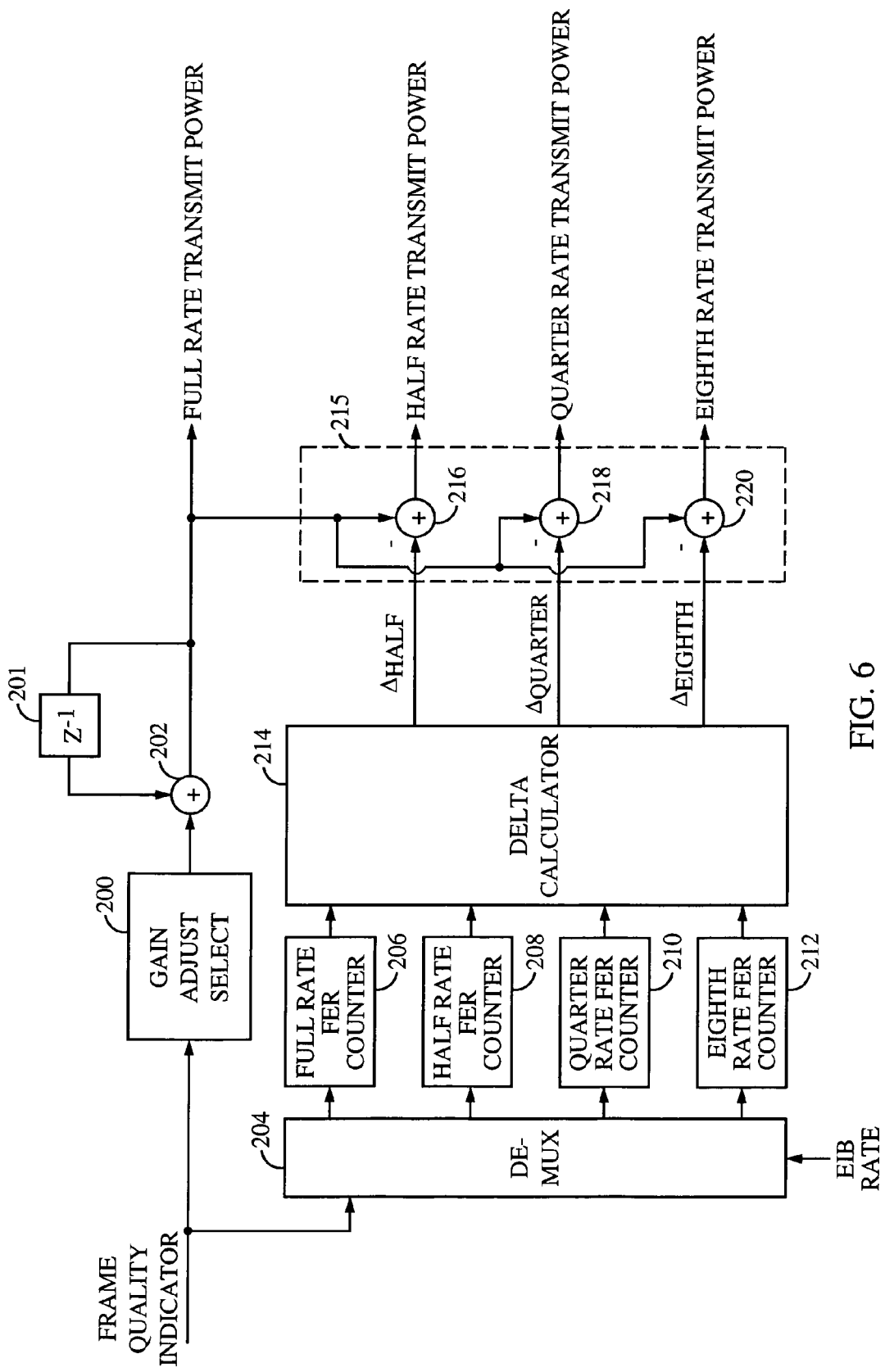
FIG. 6 illustrates an exemplary embodiment of the control processor for a single loop variable difference implementation.

Referring to FIG. 6, the received frame quality indicator bit is provided to gain adjustment selector 200. Gain adjustment selector can be implemented by programming a microprocessor, microcontroller or logic array which is well known in the art. In the exemplary embodiment, gain adjustment selector 200 selects a gain adjustment value in accordance with equation (1) above.

This gain adjustment value is provided to a summing input of summing element 202. The input to the second input of summing element 202 is the current value of the reference rate transmit power level. In the exemplary embodiment, the reference rate is full rate. The output of summing element 202 is the adjusted full rate transmit power. The full rate transmit power is provided to variable gain amplifier 64 which amplifies outgoing full rate frame in accordance with this value.

In addition, the adjusted full rate transmit power value is fed back to delay element 201. Delay 201, in the exemplary embodiment, delays the input to summing element 202 by the period of time between separate arrivals of frame quality indicator messages. In the exemplary embodiment this delay is 20 ms. The implementation of such delays is well known in the art.

The received frame quality indicator message is also provided to de-multiplexer 204. De-multiplexer 204 outputs the frame quality indicator message upon one of four outputs based upon the rate of the frame quality indicator. If the rate of the frame quality indicator is full rate, then the frame quality indicator message is provided to full rate frame error rate (FER) counter 206. Full rate FER counter 206 tracks the number of full rate frame errors in a predetermined number of full rate frame transmissions. Counter 206 can be implemented using a digital counter or by a sliding window accumulator, the implementations of which are well known in the art. In the exemplary embodiment, counter 206 tracks the number of frame errors in the last 100 full rate frames.

If the rate of the frame quality indicator is half rate then the frame quality indicator message is provided to half rate FER counter 208. Counter 208 tracks the frame errors in a predetermined number of prior half rate frames and can be implemented as described with reference to counter 206 above. If the rate of the frame quality indicator is quarter rate, then the frame quality indicator message is provided to quarter rate FER counter 210. Counter 210 tracks the frame errors in a predetermined number of prior quarter rate frames and can be implemented as described above. If the rate of the frame quality indicator is eighth rate, then the frame quality indicator message is provided to eighth rate FER counter 212. Counter 212 tracks the frame errors in a predetermined number of prior eighth rate frames and can be implemented as described above.

The frame error rate statistics from each of counters 206, 208, 210 and 212 are provided to delta calculator 214. Delta calculator 214 determines the difference values, $\Delta_{half}$, $\Delta_{quarter}$ and $\Delta_{eighth}$, in accordance with a predetermined calculation format, based upon the values provided by the counters. For example, if the frame error statistics for the half rate are too high, then delta calculator 214 will reduce the value of $\Delta_{half}$, effectively increasing the transmit power level of eighth rate frames, if the half rate power level is lower than the reference level. Typically, the half rate transmit power will be 3 dB less than the full rate transmit power.

In addition, it is not necessary that each of the difference values depend on frame error counts from all of the counters. In the exemplary embodiment, the value of $\Delta_{half}$ is based solely on the half rate FER, the output of counter 208; the value of $\Delta_{quarter}$ is based solely on the quarter rate FER, the output of counter 210; but the value of $\Delta_{eighth}$ is determined on both the full rate FER and the eighth rate FER, the outputs of counters 206 and 212.

In an improved embodiment, each of the difference values will also depend on the value of the full rate FER. In the improved embodiment, if the full rate FER is above a threshold value, it will indicate that the full rate transmit power is being increased. Since the transmission power of the other rates is determined dependent upon the full rate transmit power, the difference values are increased, when it appears from the full rate FER value from full rate FER counter 206 that the full rate transmit power is going to be increased. By increasing the difference values the transmission power of the other rates is effectively decreased, which allows the dependently set rates to "float" at their value when changes are made to the full rate transmit power.

Delta calculator 214 outputs three delta values, $\Delta_{half}$, $\Delta_{quarter}$ and $\Delta_{eighth}$. Delta calculator 214 can be implemented by programming a microprocessor, micros controller or logic array as is well known in the art. The three delta values, $\Delta_{half}$, $\Delta_{quarter}$ and $\Delta_{eighth}$ are provided to dependent rate calculator 215 along with the full rate transmit power. Dependent rate calculator 215 determines the half rate, quarter rate and eighth rate transmit powers in accordance with its inputs and a predetermined calculation format. Dependent rate calculator 215 can be implemented by programming a microprocessor, microcontroller, or logic array which is well known in the art.

In the exemplary embodiment of dependent rate calculator 215, the three delta values, $\Delta_{half}$, $\Delta_{quarter}$ and $\Delta_{eighth}$ are provided to the subtracting inputs of summing elements 216, 218 and 220, respectively. The summing input of summing elements 216, 218 and 220 is provided with the full rate transmit power level. The values of $\Delta_{half}$, $\Delta_{quarter}$ and $\Delta_{eighth}$ are subtracted from the full rate power level to yield the half rate, quarter rate and full rate power levels, respectively. As described above each of these values is provided to variable gain transmitter 64, which amplifies outgoing half rate, quarter rate and eighth rate frames in accordance with these values.

The third exemplary embodiment of methods utilizing the differences in required power between rates is referred herein as multiple loop power control method using one loop per rate. This method is similar to the single loop method described above, except that there is one loop for each of the rates. These loops are independent of one another in determining the transmission power levels of the rates which they control.

For example, when a frame quality indicator message is received that is eighth rate frame, changes are made directly in response to this message to the transmit power level of the eighth rate frames, but no changes are made to the power levels of the other three rates. Thus, each of these feedback loops takes into account only the feedback information corresponding to frames of its rate.

In the exemplary implementation, data source 60 provides a signal indicative of the rate of an outgoing frame to control processor 58, by which control processor 58 determines the rates of the frame quality indicator messages.

Figure 7:
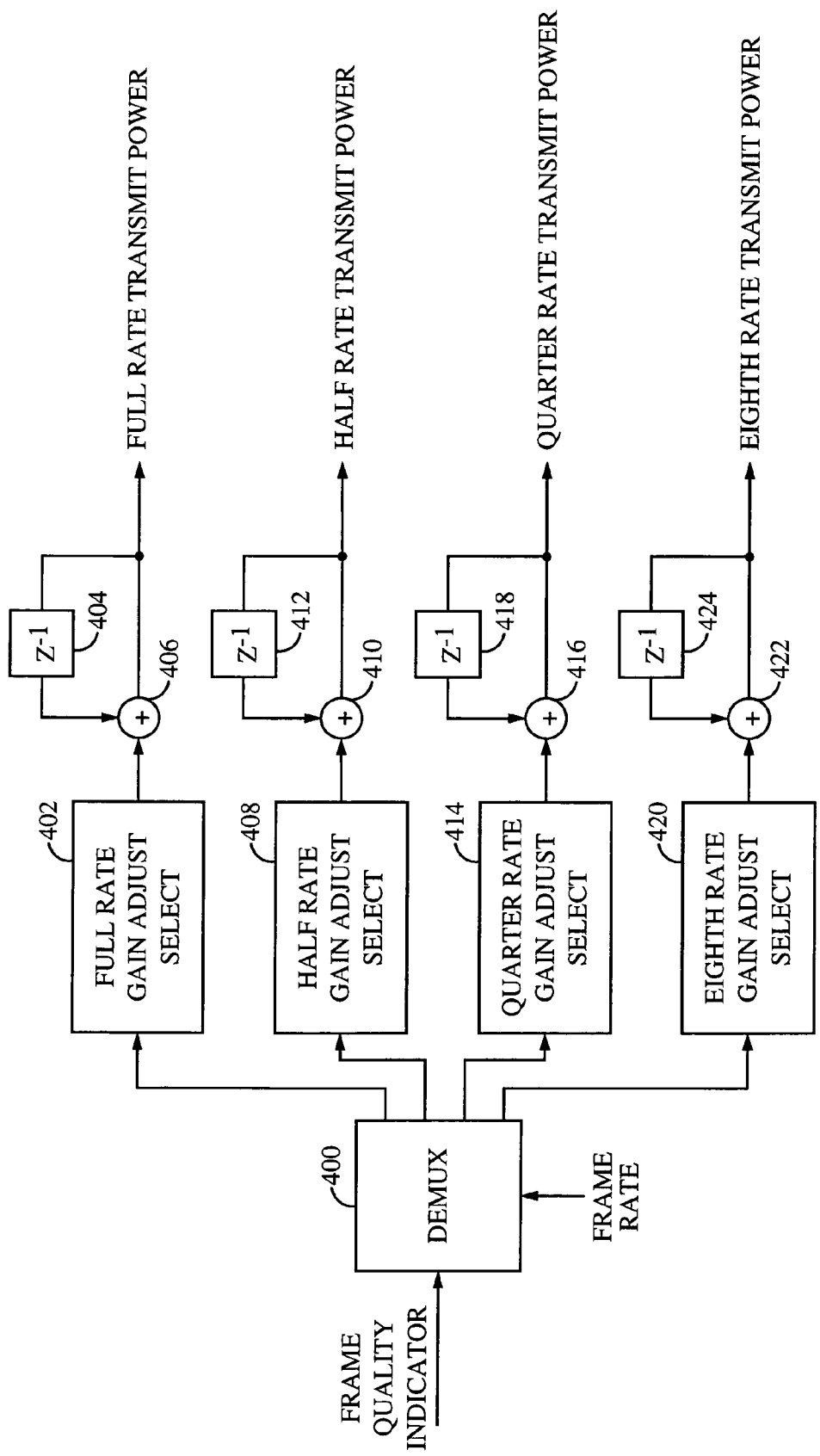
FIG. 7 illustrates an exemplary embodiment of the control processor for a multiple loop, one loop per rate, implementation.

Referring now to FIG. 7, the frame quality indicator message is provided to de-multiplexer 400. De-multiplexer 400 provides the frame quality indicator message upon one of four outputs based upon the rate of the frame quality indicator message.

If the rate of the frame quality indicator message is full rate, then the frame quality indicator message is provided to the input of full rate gain adjust selector 402. Selector 402, in response to the frame quality indicator message, outputs a gain adjustment ($GA_{full}$) value that either increases or decreases the full rate transmit power. In the exemplary embodiment, the selector 402 selects the gain adjustment value ($GA_{full}$) in accordance with equation (2) below:

$$\text{if } FQI = \begin{cases} 1, \text{ then } GA_{full} = +1.0 \\ 0, \text{ then } GA_{full} = -0.01 \end{cases} \quad (2)$$

where the FQI message has one of two possible values, either a zero "0" indicating correct reception of the frame by mobile station 30 or a one "1" indicating the occurrence of a frame error. In addition, the gain adjustment value is set to "0" if the frame quality indicator message is erased by the reverse link.

The gain adjustment value from selector 402, $GA_{full}$, is provided to a summing input of summing element 406. The other summing input of summing element 402 is supplied with the current value of the full rate transmit power. Summing element 406 outputs the adjusted full rate transmit power to variable gain transmitter 64. In addition the adjusted full rate transmit power value is provided to delay 404, which delays provision of the adjusted full rate transmit power value to summing element 406 until another full rate frame quality indicator message is received.

If the rate of the frame quality indicator message is half rate, then the frame quality indicator message is provided to the input of half rate gain adjust selector 408. Selector 408, in response to the frame quality indicator message outputs a gain adjustment ($GA_{half}$) value that either increases or decreases the half rate transmit power. In the exemplary embodiment, the selector 408 selects the gain adjustment value ($GA_{half}$) in accordance with equation (3) below:

$$\text{if } FQI = \begin{cases} 1, \text{then } GA_{half} = +0.500 \\ 0, \text{then } GA_{half} = -0.005 \end{cases} \quad (3)$$

where the FQI message has one of two possible values, either a zero "0" indicating correct reception of the frame by mobile station 30 or a one "1" indicating the occurrence of a frame error.

The gain adjustment value from selector 408, $GA_{half}$, is provided to a summing input of summing element 410. The other summing input of summing element 410 is supplied with the current value of the half rate transmit power. Summing element 410 outputs the adjusted half rate transmit power to variable gain transmitter 64. In addition the adjusted half rate transmit power value is provided to delay 412, which delays provision of the adjusted half rate transmit power value to summing element 410 until another half rate frame quality indicator message is received.

If the rate of the frame quality indicator message is quarter rate, then the frame quality indicator message is provided to the input of quarter rate gain adjust selector 414. Selector 414, in response to the frame quality indicator message, outputs a gain adjustment ($GA_{quarter}$) value that either increases or decreases the quarter rate transmit power. In the exemplary embodiment, the selector 414 selects the gain adjustment value ($GA_{quarter}$) in accordance with equation (4) below:

$$\text{if } FQI = \begin{cases} 1, \text{then } GA_{quarter} = +0.300 \\ 0, \text{then } GA_{quarter} = -0.003 \end{cases} \quad (4)$$

where the FQI message has one of two possible values, either a zero "0" indicating correct reception of the frame by mobile station 30 or a one "1" indicating the occurrence of a frame error.

The gain adjustment value from selector 414, $GA_{quarter}$, is provided to a summing input of summing element 416. The other summing input of summing element 416 is supplied with the current value of the quarter rate transmit power. Summing element 416 outputs the adjusted quarter rate transmit power to variable gain transmitter 64. In addition the adjusted quarter rate transmit power value is provided to delay 418, which delays provision of the adjusted quarter rate transmit power value to summing element 416 until another quarter rate frame quality indicator message is received.

If the rate of the frame quality indicator message is eighth rate, then the frame quality indicator message is provided to the input of eighth rate gain adjust selector 420. Selector 420, in response to the frame quality indicator message, outputs a gain adjustment ($GA_{eighth}$) value that either increases or decreases the eighth rate transmit power. In the exemplary embodiment, selector 420 selects the gain adjustment value ($GA_{eighth}$) in accordance with equation (5) below:

$$\text{if } FQI = \begin{cases} 1, \text{then } GA_{eighth} = +0.300 \\ 0, \text{then } GA_{eighth} = -0.003 \end{cases} \quad (5)$$

where the FQI message has one of two possible values, either a zero "0" indicating correct reception of the frame by mobile station 30 or a one "1" indicating the occurrence of a frame error.

The gain adjustment value from selector 420, $GA_{eighth}$, is provided to a summing input of summing element 422. The other summing input of summing element 422 is supplied with the current value of the eighth rate transmit power. Summing element 422 outputs the adjusted eighth rate transmit power to variable gain transmitter 64. In addition the adjusted eighth rate transmit power value is provided to delay 424, which delays provision of the adjusted eighth rate transmit power value to summing element 422 until another eighth rate frame quality indicator message is received.

As discussed previously, variable gain transmitter 64 amplifies the outgoing frames in accordance with the transmit power levels determined as described above.

The fourth exemplary embodiment of methods utilizing the differences in required power between rates is referred herein as multiple loop with one loop per frequent rate power control. This method is similar to the single loop method, except that there is one loop for each of the more frequent rates. These loops are independent of one another in determining the transmission power levels of the rates they control. The frame quality indicator message about a frame of a certain rate being tracked is used by the loop for that rate only. The power levels for rates without a loop are determined dependently from the power levels of rates that are been tracked. The difference from those tracked rates can be static or adaptive.

In the exemplary embodiment, the full rate and the eighth rate frames are the two most likely frame rates in the variable rate transmissions. These two rates are tracked by two independent loops to decide their individual power levels. The power levels of the half and quarter rates are then derived from the current levels of the full and eighth rates. For example, the quarter rate power is half the distance between full and eighth rate power levels and the half rate power level can be half way between the quarter rate and full rate power levels.

In the exemplary implementation, data source 60 provides a signal to control processor 58 indicating the rate of the outgoing frame. Control processor 58 computes the new transmission power level and provides this information to transmitter 64.

Figure 8:
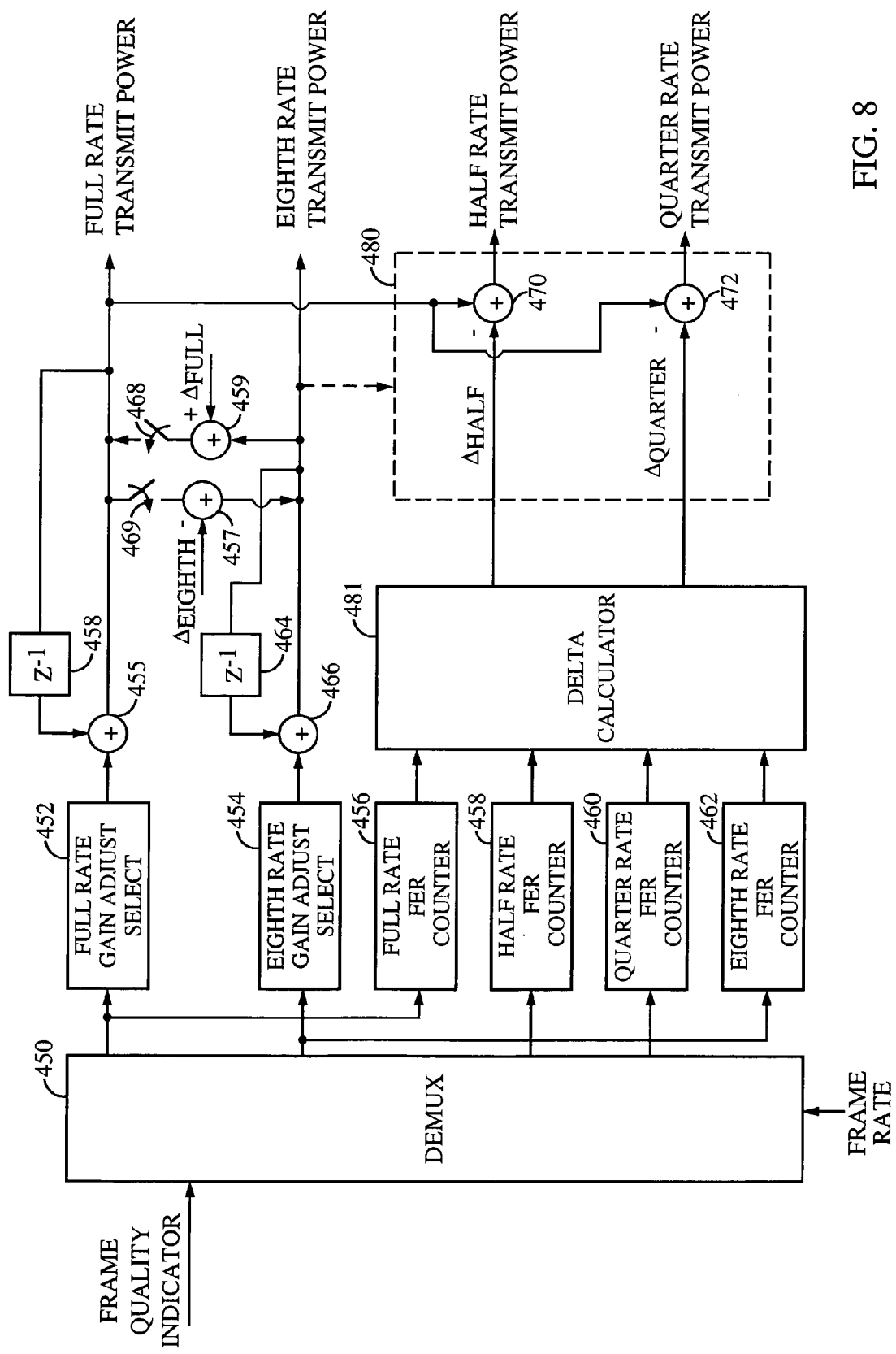
FIG. 8 illustrates an exemplary embodiment of the control processor for a multiple loop, one loop per frequent rate, implementation.

Referring to FIG. 8, the frame quality indicator message is provided to de-multiplexer 450, which outputs the frame quality indicator message upon a selected output depending on the rate of the frame quality indicator message.

If the rate of the frame quality indicator message is full rate, then the frame quality indicator signal is provided by de-multiplexer 450 to full rate gain adjust selector 452. In the exemplary embodiment, full rate gain adjust selector 452 can be implemented by programming a microprocessor, microcontroller or logic array as is well known in the art.

Full rate gain adjustment selector 452 selects a full rate gain adjustment (GA$_{full}$) value in accordance with equation (6) below:

$$\text{if } FQI = \begin{cases} 1, \text{ then } GA_{full} = +1.0 \\ 0, \text{ then } GA_{full} = -0.1 \end{cases} \quad (6)$$

where the FQI message has one of two possible values, either a zero "0" indicating correct reception of the frame by mobile station 30 or a one "1" indicating the occurrence of a frame error.

The selected full rate gain adjustment (GA$_{full}$) value is provided to a first summing input of summing element 456. The second input to summing element 456 is provided by delay element 458 and is the current full rate transmit power. Delay element 458 delays provision of the current full rate transmit power until a full rate frame quality indicator message is received. Summing element 456 adds the full rate gain adjustment value to the current full rate transmit power to determine an adjusted full rate transmit power. The adjusted full rate transmit power is provided to variable gain transmitter 64 which amplifies full rate frames in accordance with this signal.

When the frame quality indicator message is full rate, switch 469 is closed and the computed full rate transmit power is provided to a summing input of summing element 457. The subtracting input of summing element 457 is supplied with the value $\Delta_{eighth}$ a fixed value or by delta calculator 464 to compute the new value of eighth rate transmit power. In the exemplary embodiment, the value of $\Delta_{eighth}$ is static, but it is envisioned that the methods described above could be used to make the value of $\Delta_{eighth}$ dynamic. This newly determined value is provided to variable gain transmitter 64, which amplifies the outgoing eighth rate frame in accordance with this value.

If the frame quality indicator rate is eighth rate, the frame quality indicator signal is provided to eighth rate gain adjust selector 454. In the exemplary embodiment, eighth rate gain adjust selector 454 can be implemented by programming a microprocessor, microcontroller or logic array as is well known in the art. In the exemplary embodiment, gain adjustment selector 454 selects a eighth rate gain adjustment (GA$_{eighth}$) value in accordance with equation (7) below:

$$\text{if } FQI = \begin{cases} 1, \text{ then } GA_{eighth} = +0.30 \\ 0, \text{ then } GA_{eighth} = -0.03 \end{cases} \quad (7)$$

The selected eighth rate gain adjustment (GA$_{eighth}$) value is provided to a first summing input of summing element 466.

The second input to summing element 466 is provided by delay element 464 and is the current eighth rate transmit power. Delay element 464 provides the current value of the eighth rate transmit power only when an eighth rate frame quality indicator message is received. Summing element 466 adds the eighth rate gain adjustment value to the current eighth rate transmit power to determine the new eighth rate transmit power which is provided to variable gain transmitter 64, which amplifies eighth rate frames in accordance with this signal.

When the frame rate is eighth rate, switch 468 is closed and the computed eighth rate transmit power is provided to a first summing input of summing element 459. The second summing input of summing element 459 is supplied with the value $\Delta_{full}$, a fixed value or one computed by delta calculator 481, to compute the new value of the full rate transmit power. The full rate transmit power value is provided to variable gain transmitter 64 which amplifies the outgoing full rate frames in accordance with this value.

In a first exemplary embodiment, the values of the transmit power for half and quarter rate frames are determined by a fixed difference method. In this first implementation, the full rate transmit power is provided to summing elements 470 and 472. The output of summing element 470 is the half rate transmit power. In the fixed difference embodiment, $\Delta_{half}$ is a fixed value, which is subtracted from the full rate transmit power to determine the half rate transmit power. This newly determined half rate transmit power is provided to variable gain transmitter 64 which amplifies the outgoing half rate frames in accordance with this value.

Similarly, in the fixed difference implementation, the full rate transmit power is provided to summing elements 472. The output of summing element 472 is the quarter rate transmit power. In the fixed difference embodiment, $\Delta_{quarter}$ is a fixed value, which is subtracted from the full rate transmit power to determine the quarter rate transmit power. This newly determined quarter rate transmit power is provided to variable gain transmitter 64 which amplifies the outgoing quarter rate frames in accordance with this value.

In an improved embodiment, the half rate transmit power is determined in accordance with full rate transmit power and the eighth rate transmit power. In the exemplary embodiment of this improved method, the half rate transmit power is calculated as a power level half way between the full rate transmit power and the eighth rate transmit power. In the improved embodiment, the full rate transmit power and the eighth rate transmit power are provided to power level calculator 480. Calculator 480 computes the values of the half rate transmit power and the quarter rate transmit power in accordance with these values. The values $\Delta_{half}$ and $\Delta_{quarter}$ whether fixed or adaptive can be used by calculator 480 to modify quarter rate transmit power and the half rate transmit power calculated by calculator 480.

In an alternative embodiment, the values of $\Delta_{half}$ and $\Delta_{quarter}$ are adaptive values. In the variable difference exemplary embodiment, de-multiplexer 450 provides the frame quality indicator to one of four outputs based on the rate of the frame quality indicator message. If the frame quality indicator message is sent at full rate, the frame therefor, the frame quality indicator signal is provided to full rate frame error rate counter 456, which keeps track of the average number of frame errors for full rate frames as described above. If the frame quality indicator rate message is sent at half rate, the frame quality indicator signal is provided to half rate frame error rate counter 458, which keeps track of the average number of frame errors for half rate frames as described above. If the frame quality indicator rate message is sent at quarter rate, the frame quality indicator signal is provided to quarter rate frame error rate counter 460, which keeps track of the average number of frame errors for quarter rate frames as described above. If the frame quality indicator rate message is sent at eighth rate, the frame quality indicator is provided to eighth rate frame error rate counter 462, which keeps track of the average number of frame errors for eighth rate frames as described above.

The frame error counts are provided from counters 456, 458, 460 and 462 are provided to delta calculator 481. Delta calculator 481 determines the values of $\Delta_{half}$ and $\Delta_{quarter}$ in accordance with the values provided from counters 456, 458, 460 and 462. Delta calculator 481 can be implemented by programming a microprocessor, microcontroller or logic array. Delta calculator 481 provides the values of $\Delta_{half}$ and $\Delta_{quarter}$ to summing elements 470 and 472, respectively. Summing elements 470 and 472 subtract the values of $\Delta_{half}$ and $\Delta_{quarter}$ from the value of the full rate transmit power to determine the half rate transmit power and the quarter rate transmit power, respectively. These values are provided to variable gain transmitter 64 which amplifies the outgoing half rate and quarter rate frame in accordance with these signals as described above.

The fifth exemplary embodiment of methods utilizing the differences in required power between rates is referred herein as multiple loop, one loop per rate, composite reference power control. This method can be implemented using either fixed or adaptive weighting. This method is similar to the single loop method, except that there is one loop for each of the rates and the loop statistics are used together. These loops are independent of one another. The feedback about a frame of a certain rate is tracked by that loop for that rate only, while the loops for all other loops are frozen at their current levels. However, the actual transmission power level is jointly determined by the current values of all the loop output.

Figure 9:
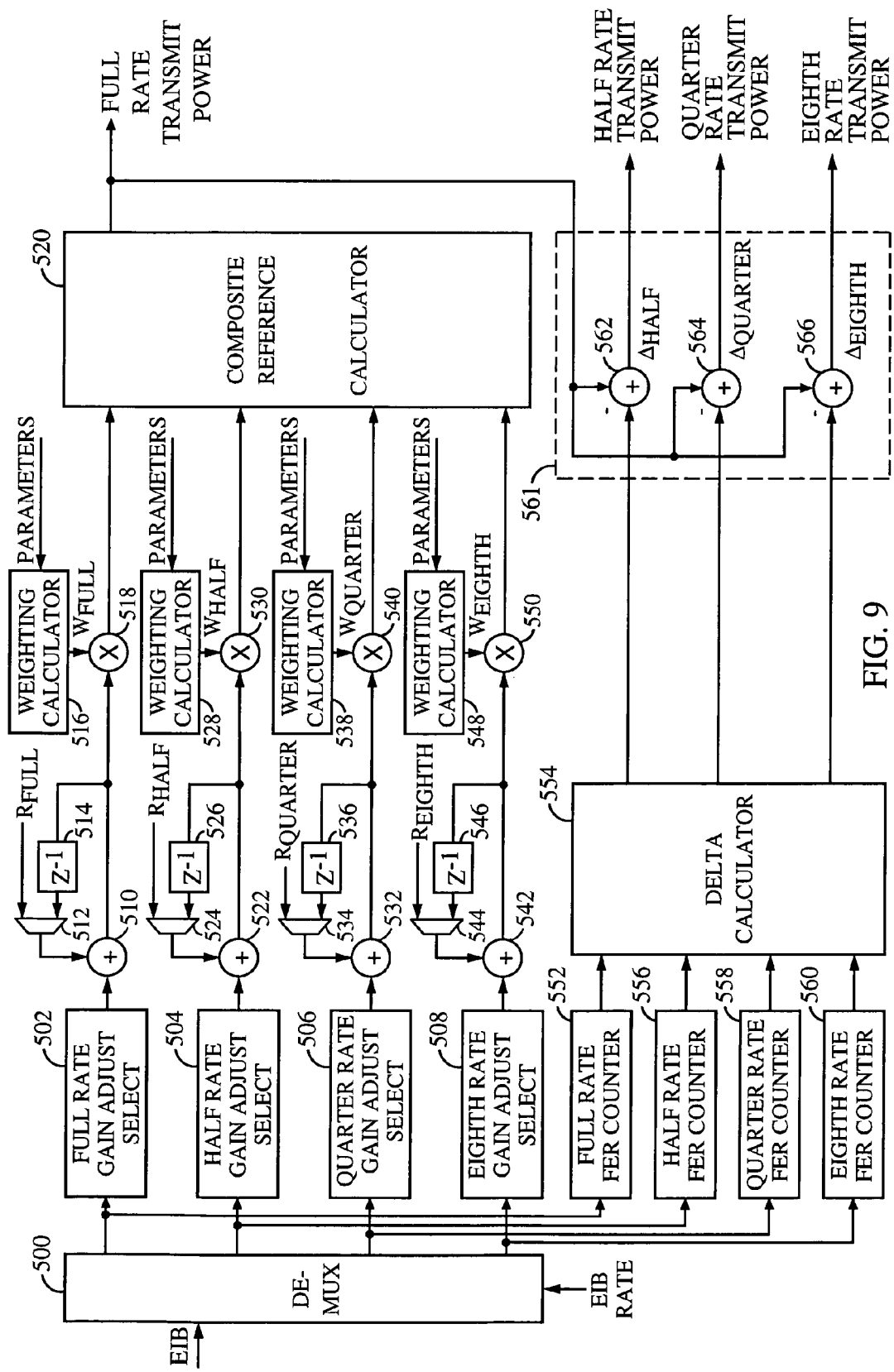
FIG. 9 illustrates an exemplary embodiment of the control processor for a multiple loop, one loop per rate, composite reference implementation.

Referring to FIG. 9, the frame quality indicator message is provided to de-multiplexer 500. De-multiplexer 500 provides the frame quality indicator message on one of four outputs, in accordance with the rate of the frame quality indicator message.

If frame quality indicator rate message is full rate, de-multiplexer 500 outputs the frame quality indicator message to full rate gain adjust selector 502. Gain adjust selector 502 outputs a gain adjustment ($GA_{full}$) value in accordance with equation (8) below:

$$\text{if } FQI = \begin{cases} 1, \text{ then } GA_{full} = +1.00 \\ 0, \text{ then } GA_{full} = -0.01 \end{cases} \quad (8)$$

The gain adjustment value is provided to summing element 510. Each of selectors 502, 504, 506 and 508 can be implemented by programming a microprocessor, microcontroller or logic array.

The second summing input of summing element 510 is the previously calculated output of summing element 510 which is provided by delay element 514 through optional multiplexer 512. Delay element 514 provides the previous output of summing element 510 whenever the rate of the frame quality indicator message is full rate.

Multiplexer 512 is optionally provided in order to refresh the input to summing element 510 in case the loop value grows "stale". In other words, the value of the output from summing element 510 becomes unacceptably different from the current required full rate transmit power. In this embodiment, the value from summing element 510 is not the full rate transmit power, but rather is a factor used in computing the full rate transmit power.

The output of summing element 510 is provided to a first input of multiplier 518. The second input of multiplier 518 is a weighting value $W_{full}$ which weights the output of 510, in accordance with the significance of that value to the computation of the reference rate by composite reference calculator 520. In a first exemplary embodiment, $W_{full}$ is a fixed value that is determined ahead of time. In an alternative embodiment, $W_{full}$ is a variable value determined by weighting factor calculator 516 in accordance with a set of parameters. Examples of parameters that might be used by weighting calculator 516 include frame error statistics, frequency of frames at this rate, etc. The value output by multiplier 518 is provided to composite reference calculator 520.

If the frame quality indicator rate is half rate, de-multiplexer 500 outputs the frame quality indicator message to half rate gain adjust selector 504. In accordance with the frame quality indicator, gain adjust selector 504 outputs a gain adjustment value ($GA_{half}$) as described in equation (9) below:

$$\text{if } FQI = \begin{cases} 1, \text{ then } GA_{half} = +0.500 \\ 0, \text{ then } GA_{half} = -0.005 \end{cases} \quad (9)$$

The gain adjustment value, $GA_{half}$, is provided to summing element 522. The second summing input of summing element 522 is provided by delay element 526 through optional multiplexer 524. Multiplexer 524 is optionally provided in order to refresh the input to summing element 522 in case the loop value grows "stale". Delay element 526 delays provision of the output of summing element 522 until the next half rate frame quality indicator is received.

The output of summing element 522 is provided to a first input of multiplier 530. The second input of multiplier 530 is a weighting value $W_{half}$ which weights the output of 522 in accordance with the significance of that value to the computation of the reference rate by composite reference calculator 520. In a first exemplary embodiment, $W_{half}$ is a fixed value. In an alternative embodiment, $W_{half}$ is a variable value determined by weighting calculator 528, in accordance with a set of parameters. Examples of parameters that might be used by weighting calculator 528 include frame error statistics, frequency of frames at this rate, etc. The value output by multiplier 530 is provided to composite reference calculator 520.

If the frame quality indicator rate is quarter rate, de-multiplexer 500 outputs the frame quality indicator to quarter rate gain adjust selector 506. In accordance with the frame quality indicator, gain adjust selector 506 outputs a gain adjustment value ($GA_{quarter}$) in accordance with equation (10) below:

$$\text{if } FQI = \begin{cases} 1, \text{ then } GA_{quarter} = +0.500 \\ 0, \text{ then } GA_{quarter} = -0.005 \end{cases} \quad (10)$$

The gain adjustment value, $GA_{quarter}$, is provided to a first input of summing element 532. The second summing input of summing element 532 is provided by delay element 536 through optional multiplexer 534. Multiplexer 534 is optionally provided in order to refresh the input to summing element 532 in case the loop value grows "stale". Delay element 536 delays provision of the output of summing element 532 until the next quarter rate frame quality indicator is received.

The output of summing element 532 is provided to a first input of multiplier 540. The second input of multiplier 532 is a weighting value $W_{quarter}$, which weights the output of summing element 532 in accordance with the significance of that value to the computation of the reference rate by composite reference calculator 520. Composite reference calculator 520 can be implemented by programming a microprocessor, microcontroller or logic array which is well known in the art. In a first exemplary embodiment, $W_{quarter}$ is a fixed value. In an alternative embodiment, $W_{quarter}$ is a variable value determined by weighting calculator 538 in accordance with a set of parameters. Examples of parameters that might be used by weighting calculator 538 include frame error statistics, frequency of frames at this rate, etc. The value output by multiplier 540 is provided to composite reference calculator 520.

If the frame quality indicator rate is eighth rate frame, de-multiplexer 500 outputs the frame quality indicator to eighth rate gain adjust selector 508. In accordance with the frame quality indicator, gain adjust selector 508 provides a gain adjustment value ($GA_{eighth}$) in accordance with equation (11) below:

$$\text{if } FQI = \begin{cases} 1, \text{ then } GA_{eighth} = +0.500 \\ 0, \text{ then } GA_{eighth} = -0.005 \end{cases} \quad (11)$$

The gain adjustment value is provided to a first input of summing element 542. The input of the second summing input of summing element 542 is provided by delay element 546 through optional multiplexer 544. Multiplexer 544 is optionally provided in order to refresh the input to summing element 542 in case the loop value grows "stale". Delay element 546 delays provision of the output of summing element 542 until the next eighth rate frame quality indicator is received.

The output of summing element 542 is provided to a first input of multiplier 550. The second input of multiplier 550 is a weighting value $W_{eighth}$, which weights the output of summing element 542 in accordance with the significance of that value to the computation of the reference rate by composite reference rate calculator 520. In a first exemplary embodiment, $W_{eighth}$ is a fixed value. In an alternative embodiment, $W_{eighth}$ is a variable value determined by weighting calculator 548 in accordance with a set of parameters. Examples of parameters that might be used by weighting calculator 548 include frame error statistics, frequency of frames at this rate, etc. The value output by multiplier 550 is provided to composite reference calculator 520.

Composite reference calculator 520 determines the value of the reference rate in accordance with the outputs of multipliers 518, 530, 540 and 550. In the exemplary embodiment, the reference rate is full rate, so reference calculator 520 outputs the full rate transmit power to variable gain transmitter 64 which amplifies the full rate frames for broadcast in accordance with this value.

The full rate transmit power is provided to dependent transmit power calculator 561. Dependent transmit power calculator 561 computes the half rate, quarter rate and eighth rate transmit power levels in accordance with a predetermined calculation format and the full rate transmit power. In an improved embodiment, dependent transmit power calculator 561 operates with difference values that can be fixed or variable.

In the exemplary embodiment of dependent transmit power calculator 561, the half rate, quarter rate and eight rate transmit powers are determined simply by subtracting the values of $\Delta_{half}$, $\Delta_{quarter}$ and $\Delta_{eighth}$ from the full rate transmit power. In the exemplary embodiment of dependent transmit power calculator 561, the full rate transmit power is provided to the summing input of summing elements 562, 564 and 566.

The subtracting input of summing element 562 is provided with the value $\Delta_{half}$. The output of summing element 562 is the half rate transmit power which is provided to variable gain transmitter 64, which amplifies the half rate frames for broadcast in accordance with this value. The subtracting input of summing element 564 is provided with the value $\Delta_{quarter}$. The output of summing element 564 is the quarter rate transmit power, which is provided to variable gain transmitter 64, which amplifies the quarter rate frames for broadcast in accordance with this value. The subtracting input of summing element 566 is provided with the value $\Delta_{eighth}$. The output of summing element 566 is the eighth rate transmit power which is provided to variable gain transmitter 64, which amplifies the eighth rate frames for broadcast in accordance with this value.

In a first exemplary embodiment, $\Delta_{half}$, $\Delta_{quarter}$ and $\Delta_{eighth}$ are fixed values. In an alternative embodiment, the values of $\Delta_{half}$, $\Delta_{quarter}$ and $\Delta_{eighth}$ are variable. In the variable difference exemplary embodiment, de-multiplexer 500 provides the frame quality indicator to one of four outputs based on the value of the frame rate signal.

If the frame quality indicator message is full rate, the frame quality indicator message is provided to full rate frame error rate counter 552, which keeps track of the frame error rate of full rate frames. If the frame quality indicator message is half rate, the frame quality indicator message is provided to half rate frame error rate counter 556, which keeps track of the frame error rate for half rate frames. If the frame quality indicator message is quarter rate, the frame quality indicator message is provided to quarter rate frame error rate counter 558, which keeps track of the frame error rate for quarter rate frames. If the frame quality indicator message is eighth rate, the frame quality indicator signal is provided to eighth rate frame error rate counter 560, which keeps track of the frame error rate for eighth rate frames.

The frame error counts from counters 552, 556, 558 and 560 are provided to delta calculator 554. Delta calculator 554 can be implemented by programming a microprocessor, microcontroller or logic array as is well known in the art. Delta calculator 554 determines the values of $\Delta_{half}$, $\Delta_{quarter}$ and $\Delta_{eighth}$ in accordance with the values provided from counters 552, 556, 558 and 560. Delta calculator 554 provides the values of $\Delta_{half}$, $\Delta_{quarter}$ and $\Delta_{eighth}$ to summing elements 562, 564 and 566, respectively. Summing elements 562, 564 and 566 subtract the adjusted values of $\Delta_{half}$, $\Delta_{quarter}$ and $\Delta_{eighth}$ from the value of the full rate transmit power to determine the half rate transmit power, quarter rate transmit power and eighth rate transmit power, respectively. These values are provided to variable gain transmitter 64 which amplifies the outgoing half rate, quarter rate and eighth rates frame in accordance with these signals.

The sixth exemplary embodiment of methods utilizing the differences in required power between rates is referred herein as single loop, composite feedback. In this embodiment, the gain adjustment selectors can either be static or dynamic. As each frame quality indicator message is received that message is used to directly adjust the transmit power of the reference rate.

In the exemplary implementation, data source 60 provides a signal to control processor 58 indicating the rate of the outgoing frame of data. Control processor 58 provides a signal indicative of the calculated transmission power levels for different rates to transmitter 64. Variable gain transmitter 64 amplifies the outgoing frame in accordance with the calculated power levels.

Figure 10:
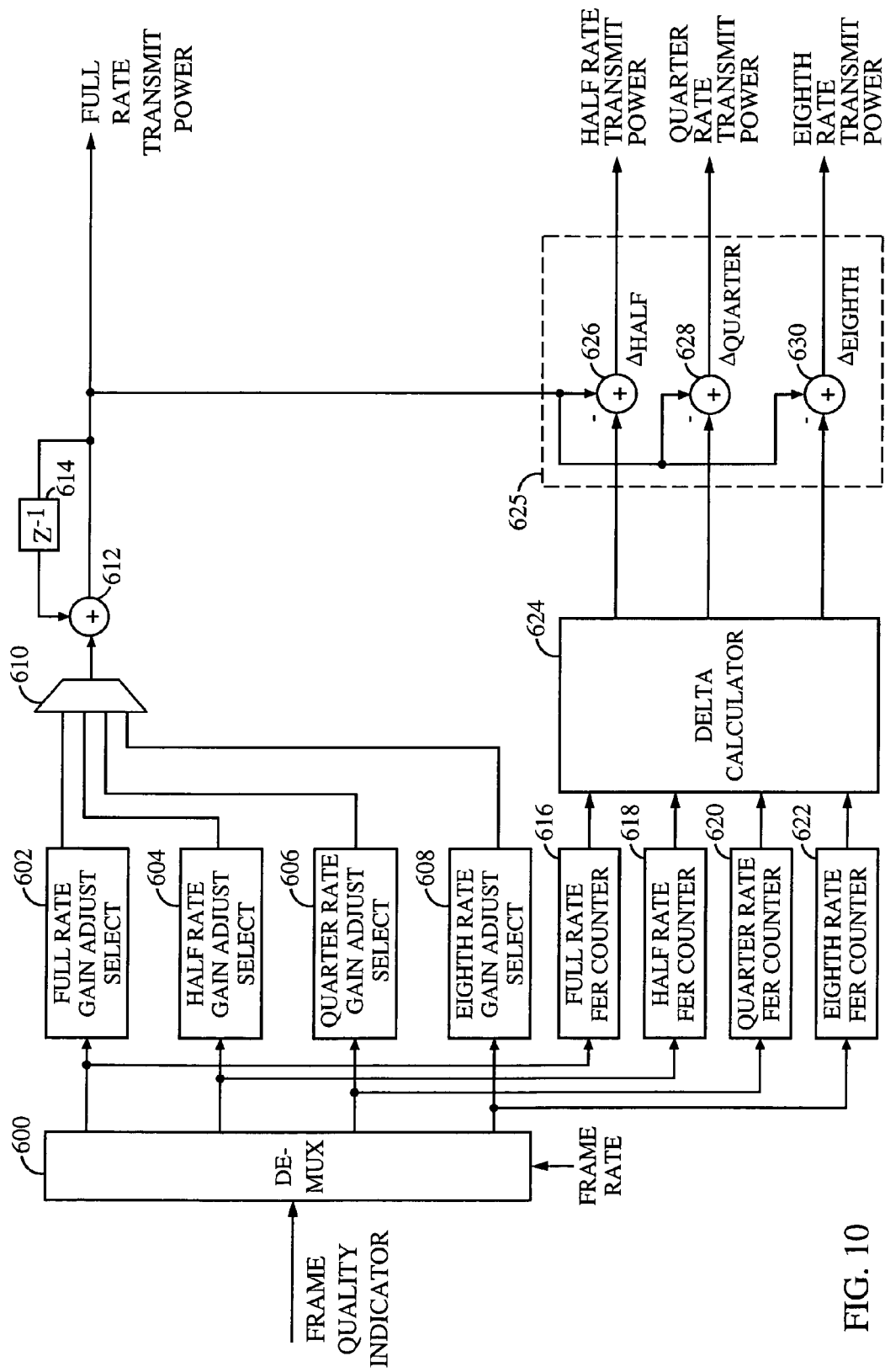
FIG. 10 illustrates an exemplary embodiment of the control processor for a single loop composite feedback implementation.

Referring to FIG. 10, the frame quality indicator message is provided to de-multiplexer 600. In accordance with rate of the frame quality indicator message, de-multiplexer 600 outputs the frame quality indicator message on one of four outputs. If the rate of the frame quality indicator message is full rate, then the frame quality message is output to full rate gain adjustment selector 602. In the exemplary embodiment, full rate gain adjustment selector 602 determines selects gain adjustment (GA$_{full}$) signal in accordance with equation (12) below:

$$\text{if } FQI = \begin{cases} 1, \text{ then } GA_{full} = +1.00 \\ 0, \text{ then } GA_{full} = -0.01 \end{cases} \quad (12)$$

where FQI is the frame indicator message with 1 indicating the occurrence of a frame error and 0 indicating the absence of a frame error.

The gain adjustment value, GA$_{full}$, is provided through multiplexer 610 to a first input of summing element 612. The second input of summing element 612 is provided with the current value of the reference rate transmit power, which in the exemplary embodiment the full rate transmit power.

If the rate of the frame quality indicator message is half rate, then the frame quality message is output to half rate gain adjustment selector 604. In the exemplary embodiment, half rate gain adjustment selector 604 selects gain adjustment value (GA$_{half}$) in accordance with equation (13) below:

$$GA_{half} = \begin{cases} 0.500 & \text{if } FQI = 1 \\ -0.005 & \text{if } FQI = 0 \end{cases} \quad (13)$$

where FQI is the frame indicator message with 1 indicating the occurrence of a frame error and 0 indicating the absence of a frame error.

The gain adjustment value, GA$_{half}$, is provided through multiplexer 610 to a first input of summing element 612. The second input of summing element 612 is provided with the current value of the reference rate transmit power.

If the rate of the frame quality indicator message is quarter rate, then the frame quality message is output to quarter rate gain adjustment selector 606. In the exemplary embodiment, quarter rate gain adjustment selector 606 selects a gain adjustment value, GA$_{quarter}$, in accordance with equation (14) below:

$$GA_{quarter} = \begin{cases} 0.300 & \text{if } FQI = 1 \\ -0.003 & \text{if } FQI = 0 \end{cases} \quad (14)$$

where FQI is the frame indicator message with 1 indicating the occurrence of a frame error and 0 indicating the absence of a frame error.

The gain adjustment value, GA$_{quarter}$, is provided through multiplexer 610 to a first input of summing element 612. The second input of summing element 612 is provided with the current value of the reference rate transmit power.

If the rate of the frame quality indicator message is eighth rate, then the frame quality message is output to eighth rate gain adjustment selector 608. In the exemplary embodiment, eighth rate gain adjustment selector 608 selects a gain adjustment value, GA$_{eighth}$, in accordance with equation (15) below:

$$GA_{eighth} = \begin{cases} 0.100 & \text{if } FQI = 1 \\ -0.001 & \text{if } FQI = 0 \end{cases} \quad (15)$$

where FQI is the frame indicator message with 1 indicating the occurrence of a frame error and 0 indicating the absence of a frame error.

The gain adjustment value, GA$_{eighth}$, is provided through multiplexer 610 to a first input of summing element 612. The second input of summing element 612 is provided with the current value of the reference rate transmit power. Selectors 602, 604, 606 and 608 can be implemented by programming a microprocessor, microcontroller or logic array as is well known in the art.

After determining the reference rate transmit power, the transmission power for the remaining rate is determined in accordance with that value. The full rate transmit power is provided to dependent transmit power calculator 625 which computes the half rate, quarter rate and eighth rate transmit powers in accordance with the full rate transmit powers. In a first exemplary implementation of dependent transmit power calculator 625, $\Delta_{half}$, $\Delta_{quarter}$ and $\Delta_{eighth}$ are fixed values. Thus, full rate transmit power is provided to summers 626, 628 and 630. And the values $\Delta_{half}$, $\Delta_{quarter}$ and $\Delta_{eighth}$ are subtracted from the full rate transmit power to determine the half rate transmit power, the quarter rate transmit power and the eighth rate transmit power, respectively.

In an alternative embodiment, the values of $\Delta_{half}$, $\Delta_{quarter}$ and $\Delta_{eighth}$ are variable. In the variable difference exemplary embodiment, de-multiplexer 500 provides the frame quality indicator to one of four outputs based on the value of the frame rate signal.

If the rate of the frame quality indicator message is full rate, the frame quality indicator signal is provided to full rate frame error rate counter 616, which keeps track of the frame error rate for full rate frames. If the rate of the frame quality indicator message is half rate, the frame quality indicator message is provided to half rate frame error rate counter 618, which tracks the frame error rate of half rate frames. If the rate of the frame quality indicator message is quarter rate, the frame quality indicator signal is provided to quarter rate frame error rate counter 620, which tracks the frame error rate for quarter rate frames. And if the rate of the frame quality indicator message is eighth rate, the frame quality indicator signal is provided to eighth rate frame error rate counter 622, which tracks the frame error rate for eighth rate frames.

The frame error counts from counters 616, 618, 620 and 622 are provided to delta calculator 624. Delta calculator 624 determines the values of $\Delta_{half}$, $\Delta_{quarter}$ and $\Delta_{eighth}$ in accordance with the values provided from the counters. Delta calculator 624 can be implemented by programming a microprocessor, microcontroller or logic array as is well known in the art. Delta calculator 624 provides the values of $\Delta_{half}$, $\Delta_{quarter}$ and $\Delta_{eighth}$ to summing elements 626, 628 and 630, respectively. Summing elements 626, 628 and 630 subtract the calculated values of $\Delta_{half}$, $\Delta_{quarter}$ and $\Delta_{eighth}$ from the value of the full rate transmit power to determine the half rate transmit power, quarter rate transmit power and eighth rate transmit power, respectively. These values are provided to variable gain transmitter 64 which amplifies the outgoing half rate, quarter rate and eighth rates frame in accordance with these signals.

The previous description of the preferred embodiments are provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for controlling transmission power of variable rate frames of data, comprising:
   receiving a frame quality message from a remote communication station;
   receiving a gain adjustment value and a previous reference rate transmit value, and summing said gain adjustment value and said previous reference rate transmit value to provide a reference rate transmit power level;
   determining at least one additional transmit power level in accordance with said reference rate transmit power level and providing a transmit power signal based at least in part on said one additional transmit power level; and
   amplifying said variable rate frames in accordance with said transmit power signal and a rate of said variable rate frames of data.

2. The method of claim 1 further comprising:
   receiving said reference rate transmit power level and a fixed difference value; and
   summing said reference rate transmit power level and said fixed difference value to determine said at least one additional transmit power level.

3. The method of claim 1 further comprising:
   receiving said reference rate transmit power level and a variable difference value; and
   summing said reference rate transmit power level and said variable difference value to determine said at least one additional transmit power level.

4. The method of claim 3 further composing:
   determining at least one frame error rate value; and
   using said at least one frame error rate value to determine said variable difference value.

5. The method of claim 4 further comprising:
   receiving said frame quality message and outputting said frame quality message upon a selected output in accordance with a frame quality message rate; and
   counting said frame quality message rate upon the selected output.

6. An apparatus for controlling transmission power of variable rate frames of data comprising:
   means for receiving a frame quality message from a remote communication station;
   means for receiving a gain adjustment value and a previous reference rate transmit value, and summing said gain adjustment value and said previous reference rate transmit value to provide a reference rate transmit power level;
   means for determining at least one additional transmit power level in accordance with said reference rate transmit power level and providing a transmit power signal based at least in part on said one additional transmit power level; and
   means for amplifying said variable rate frames in accordance with said transmit power signal and a rate of said variable rate frames of data.

7. The apparatus of claim 6 further comprising;
   means for receiving said reference rate transmit power level and a fixed difference value; and
   means for summing said reference rate transmit power level and said fixed difference value to determine said at least one additional transmit power level.

8. The apparatus of claim 6 further comprising:
   means for receiving said reference rate transmit power level and a variable difference value; and
   means for summing said reference rate transmit power level and said variable difference value to determine said at least one additional transmit power level.

9. The apparatus of claim 8 further comprising:
   means for determine at least one frame error rate value; and
   means for using said at least one frame error rate value to determine said variable difference value.

10. The apparatus of claim 9 further comprising:
    means for receiving said frame quality message and outputting said frame quality message upon a selected output in accordance with a frame quality message rate; and
    means for counting said frame quality message rate upon the selected output.

* * * * *

UNITED STATES PATENT AND TRADEMARK OFFICE
CERTIFICATE OF CORRECTION

| | | |
|---|---|---|
| PATENT NO. | : 6,977,967 B1 | Page 1 of 1 |
| APPLICATION NO. | : 09/597940 | |
| DATED | : December 20, 2005 | |
| INVENTOR(S) | : Tiedemann, Jr. et al. | |

It is certified that error appears in the above-identified patent and that said Letters Patent is hereby corrected as shown below:

Page 1,
Section (74), replace "Oehlinc" with --Oehling-.

Signed and Sealed this

Twenty-ninth Day of August, 2006

JON W. DUDAS
*Director of the United States Patent and Trademark Office*